United States Patent
An et al.

(10) Patent No.: US 12,140,960 B2
(45) Date of Patent: Nov. 12, 2024

(54) METHOD FOR PROCESSING MAP OF CLOSED SPACE, APPARATUS, AND MOBILE DEVICE

(71) Applicant: Qfeeltech (Beijing) Co., Ltd., Beijing (CN)

(72) Inventors: Huizhong An, Beijing (CN); Chenhao Wu, Beijing (CN); Yiming Zhang, Beijing (CN); Zhen Chen, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 264 days.

(21) Appl. No.: 17/838,210

(22) Filed: Jun. 11, 2022

(65) Prior Publication Data

US 2022/0334587 A1    Oct. 20, 2022

Related U.S. Application Data

(63) Continuation of application No. PCT/CN2020/136017, filed on Dec. 14, 2020.

(30) Foreign Application Priority Data

Dec. 31, 2019 (CN) .......................... 201911406187.4

(51) Int. Cl.
G05D 1/00 (2024.01)

(52) U.S. Cl.
CPC ......... *G05D 1/0238* (2013.01); *G05D 1/0214* (2013.01); *G05D 1/0219* (2013.01); *G05D 1/0274* (2013.01)

(58) Field of Classification Search
CPC .. G05D 1/0238; G05D 1/0214; G05D 1/0219; G05D 1/0274; G05D 1/246;

(Continued)

(56) References Cited

U.S. PATENT DOCUMENTS 7,085,624 B2 *  8/2006  Aldred ................ G05D 1/0274
                                                          700/254
2019/0369640 A1  12/2019  He et al.
(Continued)

FOREIGN PATENT DOCUMENTS

CN    106292654 A  *  1/2017
CN    108228741 A      6/2018
(Continued)

OTHER PUBLICATIONS

CN106292654 Translation.pdf (Translation of CN-106292654-A) (Year: 2024).*

(Continued)

*Primary Examiner* — Bao Long T Nguyen
(74) *Attorney, Agent, or Firm* — MILLBURN IP PLLC

(57) ABSTRACT

A method for processing a map of a closed space is provided. The method includes obtaining a plurality of self-locations of a mobile device. The method also includes obtaining a plurality of obstacle locations. The method also includes obtaining a boundary profile based on the obstacle locations, the boundary profile being a closed line formed by sequentially connecting multiple adjacent obstacle locations. The method also includes obtaining a self-circle based on the self-locations of the mobile device, the self-circle being a closed line formed by sequentially connecting multiple adjacent self-location of the mobile device. The method also includes determining the boundary profile as an outer profile when the boundary profile encircles the self-circle at an outer side of the self-circle. The method further includes processing the map of the closed space based on the outer profile.

18 Claims, 18 Drawing Sheets

(58) Field of Classification Search
CPC .. A47L 11/28; A47L 11/4036; A47L 11/4072; G06F 16/29
See application file for complete search history.

(56) References Cited

U.S. PATENT DOCUMENTS

2020/0362536 A1    11/2020  Shimamura et al.
2022/0022716 A1*   1/2022  Wu ........................ G01S 17/931

FOREIGN PATENT DOCUMENTS

| | | |
|---|---|---|
| CN | 109946715 A | 6/2019 |
| CN | 110320915 A | 10/2019 |
| WO | 2017144350 A1 | 8/2017 |
| WO | 2019167203 A1 | 9/2019 |

OTHER PUBLICATIONS

International Search Report with English translation, and Written Opinion with partial English translation, mailed Mar. 12, 2021, in International Application No. PCT/CN2020/136017, filed on Dec. 22, 2020 (12 pages).

* cited by examiner

METHOD FOR PROCESSING MAP OF CLOSED SPACE, APPARATUS, AND MOBILE DEVICE

CROSS REFERENCE TO RELATED APPLICATIONS

This application is a continuation of International Application No. PCT/CN2020/136017, filed on Dec. 14, 2020, which claims priority to Chinese Patent Application No. CN/201911406187.4, filed on Dec. 31, 2019. The contents of the above-reference applications are incorporated by reference in their entireties.

TECHNICAL FIELD

The present disclosure relates to the technical field of mobile devices, and more specifically, to a method for processing a map of a closed space, an apparatus, and a mobile device.

BACKGROUND

Mobile devices are devices that can autonomously execute tasks within a pre-set closed space. Currently available mobile devices typically include, but are not limited to, cleaning robots (such as smart floor sweeping robots, smart floor mopping robots, window cleaning robots), companion type mobile robots (such as smart electronic pets, nanny robots), service type mobile robots (such as reception robots in hotels, inns, meeting places), industrial inspection smart devices (such as power line inspection robots, smart forklifts, etc.), security robots (such as home or commercial smart security robots).

A mobile device typically moves autonomously within a limited space. For example, cleaning robots, companion type mobile robots typically move indoor, service type mobile robots typically move within a specific limited space in a hotel, meeting place. The limited space may be called a work zone of the mobile device.

A mobile device typically needs a map corresponding to the work zone for providing location information for its movement, such that the mobile device can plan its movement path at a high efficiency. Generally speaking, the closed space where the mobile device is located typically includes multiple zones. For example, the work zone in which the cleaning robot is located is an indoor space. The indoor space includes multiple rooms. Each room includes multiple corresponding zones. The mobile device can execute tasks based on divided zones to increase the execution efficiency. If the mobile device needs to execute tasks based on divided zones, information in the map needs to be further processed. For example, boundary recognition, clustering of location points, etc., may be performed to obtain basis information for zone division. The method implemented in conventional technology may be difficult to achieve an accurate division of the closed space into multiple zones directly based on the map. Therefore, the application of the mobile device may be limited in scope.

SUMMARY OF THE DISCLOSURE

To address issues existing in conventional technologies to at least a certain degree, the present disclosure provides a method for processing a map of a closed space, an apparatus, and a mobile device, which implement the disclosed method.

The present disclosure provides the following technical solutions:

according to a first aspect of the present disclosure, a method for processing a map for a closed space is provided. The method includes: obtaining a plurality of self-locations of the mobile device; obtaining a plurality of obstacle locations; obtaining a boundary profile based on the obstacle locations, the boundary profile being a closed line formed by sequentially connecting multiple adjacent obstacle locations; obtaining a self-circle based on the self-locations of the mobile device, the self-circle being a closed line formed by sequentially connecting multiple adjacent self-location of the mobile device; determining the boundary profile as an outer profile when the boundary profile encircles the self-circle at an outer side of the self-circle; and processing the map of the closed space based on the outer profile.

In some embodiments, the method also includes: obtaining the map of the closed space; marking in the map at least one of: the obstacle locations, the boundary profile, the self-locations of the mobile device, or the self-circle.

In some embodiments, processing the map of the closed space based on the outer profile includes at least one of the following: updating types of obstacles in the map of the closed space based on the outer profile; the types of the obstacles including at least outside boundary; recognizing zones of the closed space based on the outer profile; performing zone division on the closed space based on the outer profile; updating the map of the closed space based on the outer profile; and determining or updating a map frame in the map of the closed space based on the outer profile.

In some embodiments, the method also includes: determining the boundary profile as an inner profile when the self-circle encloses the boundary profile at an outer side of the boundary profile.

In some embodiments, outer profile location points on the outer profile have corresponding outer profile confidence levels, the method also includes: when the mobile device again determines an outer profile in a subsequent movement, and the again-determined outer profile and a previously determined historical outer profile include an outer profile location point at a same location, increasing an outer profile confidence level of the outer profile location point located at the same location; and/or, when the mobile device again determines an outer profile in a subsequent movement, and at least one historical outer profile location point on a previously determined historical outer profile is not located on the again-determined outer profile, decreasing an outer profile confidence level of the historical outer profile location point that is not on the again-determined outer profile.

In some embodiments, processing the map of the closed space based on the outer profile includes determining or updating a map frame in the map of the closed space based on the outer profile, and determining or updating the map frame in the map of the closed space based on the outer profile includes: when an outer profile confidence level of an outer profile location point falls within a first predetermined threshold range, determining or updating the map frame based on the outer profile location point that includes the outer profile confidence level falling within the first predetermined threshold range.

In some embodiments, updating the map of the closed space based on the outer profile includes: when the mobile device again determines an outer profile in a subsequent movement, and at least one historical outer profile location point on a previously determined historical outer profile is not on the again-determined outer profile, updating the map based on a new outer profile location point that is located on the again-determined outer profile and not located on the previously determined historical outer profile.

In some embodiments, when the outer profile location points have corresponding outer profile confidence levels, updating the map of the closed space based on the outer profile includes: when an outer profile confidence level of a historical outer profile location point on a previously determined historical outer profile falls within a second predetermined threshold range, removing the outer profile location point that has the outer profile confidence level falling within the second predetermined threshold range from the map, such that the updated map no longer includes the outer profile location point that has the outer profile confidence level falling within the second predetermined threshold range.

In some embodiments, inner profile location points have corresponding inner profile confidence levels, the method also includes: when the mobile device again determines an inner profile, and the again-determined inner profile and a previously determined historical inner profile include an inner profile location point at a same location, increasing an inner profile confidence level of the inner profile location point located at the same location; and/or when the mobile device again determines an inner profile in a subsequent movement, and at least one historical inner profile location point on a previously determined historical inner profile is not on the again-determined inner profile, decreasing an inner profile confidence level of the historical inner profile location point that is not on the again-determined inner profile.

In some embodiments, the method also includes marking the inner profile in the map as a map detail; or, when each inner profile confidence level of each inner profile location point on the inner profile falls within a third predetermined threshold range, marking the inner profile in the map as the map detail.

In some embodiments, the method also includes: when an inner profile confidence level of an inner profile location point falls within a fourth predetermined threshold range, removing the inner profile location point having the inner profile confidence level falling within the fourth predetermined threshold range from the map, such that the updated map no longer includes the inner profile location point having the inner profile confidence level falling within the fourth predetermined threshold range.

In some embodiments, obtaining the plurality of obstacle locations includes: continuously detecting obstacles when the mobile device moves within a work zone, calculating the obstacle locations based on parameters of the mobile device and self-locations of the mobile device when detecting the obstacles; and/or, continuously detecting obstacles when the mobile device moves within a work zone, and determining distance information of the obstacles, and calculating the obstacle locations based on the distance information of the obstacles and the self-locations of the mobile device when detecting the obstacles; and/or, continuously detecting obstacles when the mobile device moves within a work zone, and obtaining the obstacle locations through the detection; and/or, obtaining the obstacle locations by the mobile device based on a historical map.

According to a second aspect of the present disclosure, an apparatus for processing a map of a closed space is provided. The apparatus includes: a first acquisition device configured to obtain a plurality of self-locations of a mobile device; a second acquisition device configured to obtain a plurality of obstacle locations; a third acquisition device configured to obtain a boundary profile based on the obstacle locations, the boundary profile being a closed line formed by sequentially connecting multiple adjacent obstacle locations; a fourth acquisition device configured to obtain a self-circle based on the self-locations of the mobile device, the self-circle being a closed line formed by sequentially connecting multiple adjacent self-locations of the mobile device; a first determination device configured to determine the boundary profile as an outer profile when the boundary profile encircles an outer side of the self-circle; and a map processing device configured to process the map of the closed space based on the outer profile.

According to a third aspect of the present disclosure, a mobile device is provided. The mobile device includes: a motion sensor configured to obtain motion parameter information of the mobile device; an environment sensor configured to obtain obstacle information in a work zone; and a processor configured to: obtain a plurality of self-locations of the mobile device and a plurality of obstacle locations based on the motion parameter information and/or the obstacle information; obtain a boundary profile based on the obstacle locations, the boundary profile being a closed line formed by sequentially connecting multiple adjacent obstacle locations; obtain a self-circle based on the self-locations of the mobile device, the self-circle being a closed line formed by sequentially connecting multiple adjacent self-locations of the mobile device; determine the boundary profile as an outer profile when the boundary profile encircles the self-circle at an outer side of the self-circle; process a map of a closed space based on the outer profile.

According to a fourth aspect of the present disclosure, a non-transitory computer-readable storage medium is provided. When instructions stored in the storage medium are executed by the processor of the mobile device, any method according to the first aspect may be performed.

The technical solutions of the present disclosure have the following advantages:

by obtaining a boundary profile based on the obstacle locations, obtaining a self-circle based on the self-locations of the mobile device, determining an outer profile based on a location relationship between the boundary profile and the self-circle, and processing a map of a closed space based on the outer profile, directly processing the map based on the outer profile can be achieved, and the disclosed method does not require processing the information in the map first and then processing the map. For example, based on the outer profile, the following actions can be performed: recognizing the outside boundary of the closed space, recognizing actual zone division of the closed space, and/or automatically dividing zones for the closed space. Furthermore, the mobile device can be controlled to execute tasks in the divided zones, thereby implementing customized tasks, increasing work efficiency, and expanding the intelligence level and application scope of the mobile device. Moreover, the outer profile is a closed line formed by sequentially connecting multiple adjacent obstacle locations, and encircles, at an outer side, a closed line formed by sequentially connecting multiple adjacent self-locations of the mobile device. That is, the outer profile is located at the outside boundary location. This makes the zone division more practical. The processing of the map based on the outer profile is more accurate and reliable. Zone division can be more conveniently carried out based on the actual situation.

It should be understood that the above general description and the subsequent detailed descriptions are illustrative and explanatory, and do not limit the scope of the present disclosure.

Other aspects of the present disclosure can be understood by those skilled in the art in light of the description, the claims, and the drawings of the present disclosure.

BRIEF DESCRIPTION OF THE DRAWINGS

The following drawings constitute part of the specification and are incorporated in the specification. The drawings illustrate some embodiments consistent with the scope of the present disclosure. The drawings and the specification are for explaining the principle of the present disclosure, and do not limit the scope of the present disclosure.

DETAILED DESCRIPTION

Figure 1:
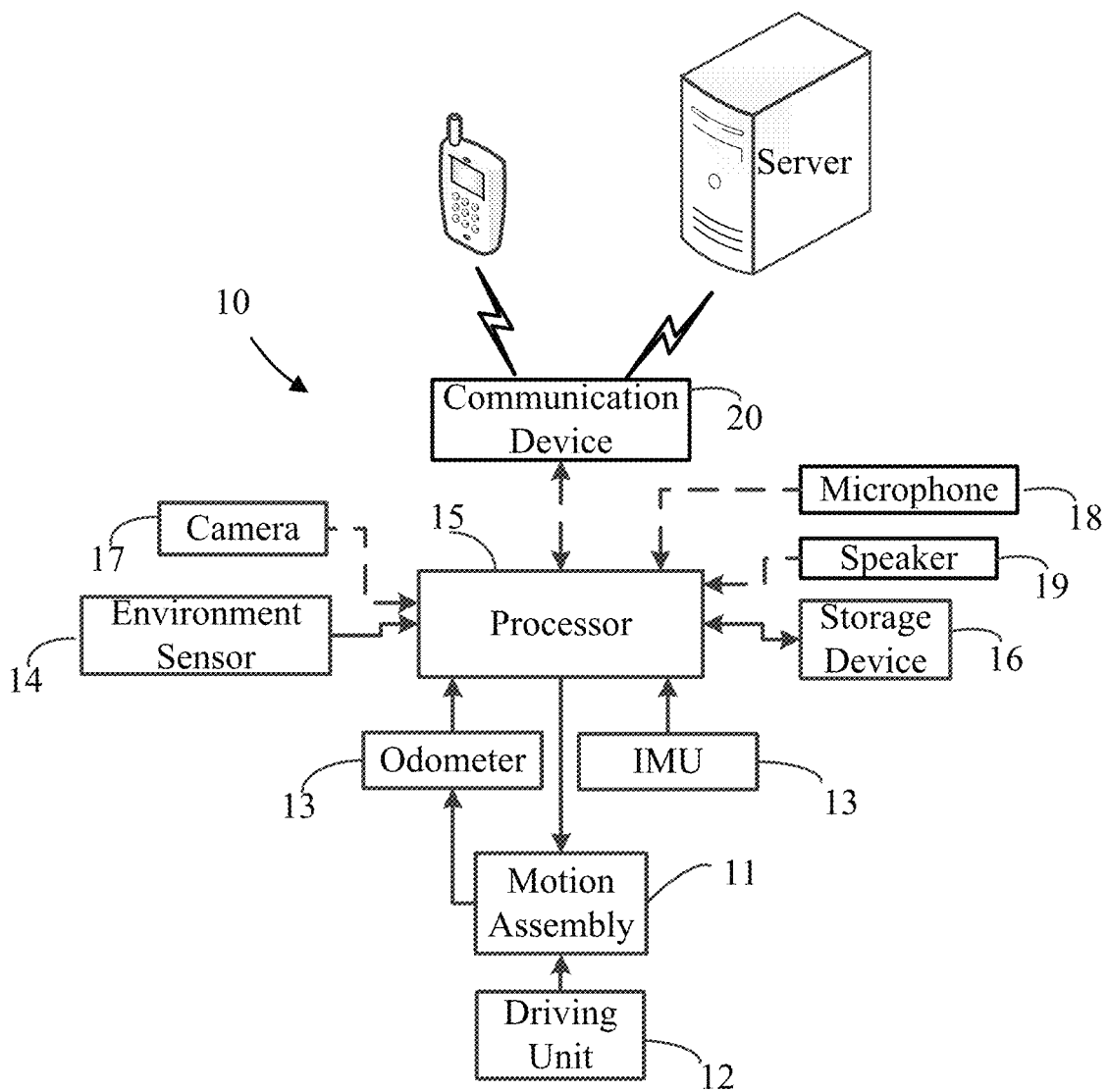
FIG. 1 illustrates a structural diagram of a mobile device, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted. The implementations described in the various embodiments do not represent all possible implementations consistent with the scope of the present disclosure. They are merely examples of the apparatus, devices, and methods that are consistent with certain aspects of the principles of the present disclosure, as described in the claims and specification.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

The term "processor" used herein may encompass any suitable processor, such as a central processing unit ("CPU"), a graphics processing unit ("GPU"), an application specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor. The terms "module" and "unit" as used herein may be implemented as or may include both hardware and software components. Hardware components may include circuits, gates, etc., configured to process signals and/or data.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

Figure 12:
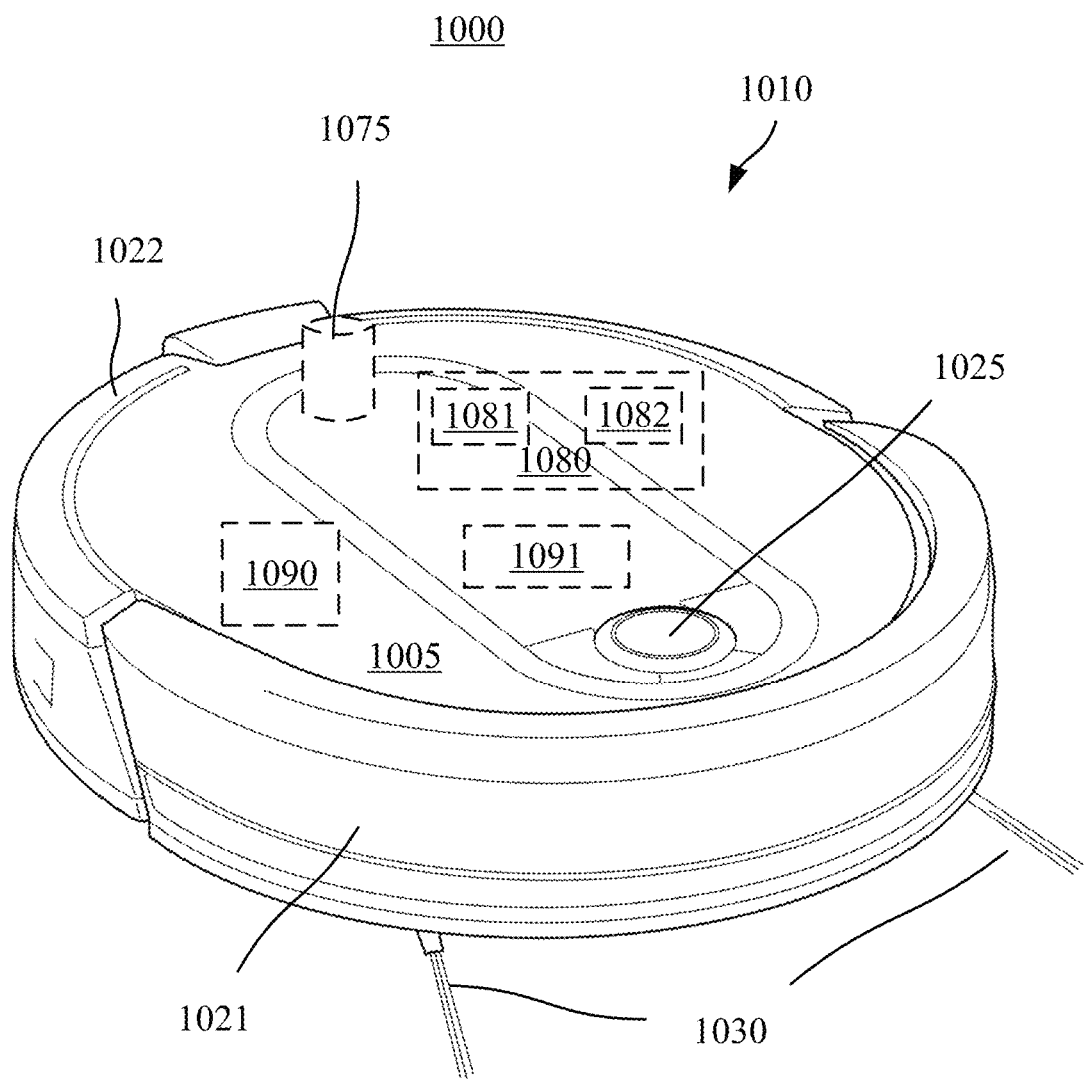
FIG. 12 illustrates a top perspective view of a mobile device, according to an embodiment of the present disclosure.

Referring to FIG. 12, FIG. 12 shows a schematic top perspective view of a mobile device 1000, according to an embodiment of the present disclosure. The mobile device 1000 may be an embodiment of any mobile device (e.g., mobile device 10) described herein and illustrated in other figures. It is noted that the mobile device 1000 shown in FIG. 12 is for illustrative purposes. In practice, the mobile device may have structures, elements different from those shown in FIG. 12. The mobile device 1000 also be referred to as an autonomous mobile device. Examples of the mobile device 1000 may include a cleaning device or robot, a vacuum cleaner or cleaning robot, a floor sweeping and/or mopping robot. The mobile device 1000 may include a main body 1010. The main body 1010 may have any suitable shape, such as a circular shape (as shown in FIG. 12), a rectangle shape, a square shape, an oval shape, or a combination thereof. The main body 1010 may include an exterior housing (or referred to as a housing) 1005 for enclosing and accommodating various elements, parts, or components of the mobile device 1000. The main body 1010 (or the housing 1005) may include a first bumper (or first cover, front bumper) 1021 and a second bumper (or second cover, rear bumper) 1022 at a circumferential side of the main body 1010. The first bumper 1021 may be separated from the second bumper by one or more gaps. At least one of the first bumper 1021 or the second bumper 1022 may be resiliently coupled with the housing 1005 or another part of the main body 1010 through an elastic member, such as a spring (not shown). The autonomous mobile device 1000 may also include a sensing device configured to acquire environmental data of a work zone in which the mobile device 1000 moves or operates. The sensing device may include at least one of a camera 1025 or a distance measuring device 1075. The camera 1025 may be configured to capture one or more images of the environment in which the mobile device 1000 moves. The camera 1025 may be mounted at any location of the mobile device 1000, e.g., a top portion of the housing, a side portion, a back portion, etc. In some embodiments, two or more cameras may be disposed at various portions of the mobile device 1000. In some embodiments, the distance measuring device (or sensor) 1075 may be configured to measure a distance between the mobile device 1000 and an obstacle. For example, in some embodiments, the distance measuring device 1075 may be a laser-based distance measuring device, such as Light Detection and Ranging ("Lidar") sensor.

The mobile device 1000 may include a processor 1090. The processor 1090 may be a controller. The processor 1090 may be an embodiment of any processor described herein or illustrated in other figures. The processor 1090 may be any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. The processor 1090 may be implemented as software, hardware, firmware, or a combination thereof.

The mobile device 1000 may include a data storage device 1091 configured to store data, signals, images, processor-executable instructions or codes, etc. The data storage device 1091 may also be referred to as a non-transitory computer-readable medium. The non-transitory computer-readable medium may be any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc. The processor 1090 may store data into the data storage device 1091, or retrieve data from the data storage device 1091.

The mobile device 1000 may include a communication device 1080 configured to communicate with another device, such as a cloud server, a docking station, a smart phone, another similar autonomous mobile device, etc. The communication device 1080 may include a receiver 1081 configured to receive data or signals from another device, and a transmitter 1082 configured to transmit data or signals to another device. In some embodiments, the receiver 1081 and the transmitter 1082 may be an integral transceiver.

The mobile device 1000 may further include one or more cleaning devices, such as one or more brushes when the mobile device 1000 is provided with a floor cleaning function. For illustrative purposes, FIG. 12 shows two brushes 1030.

Figure 13:
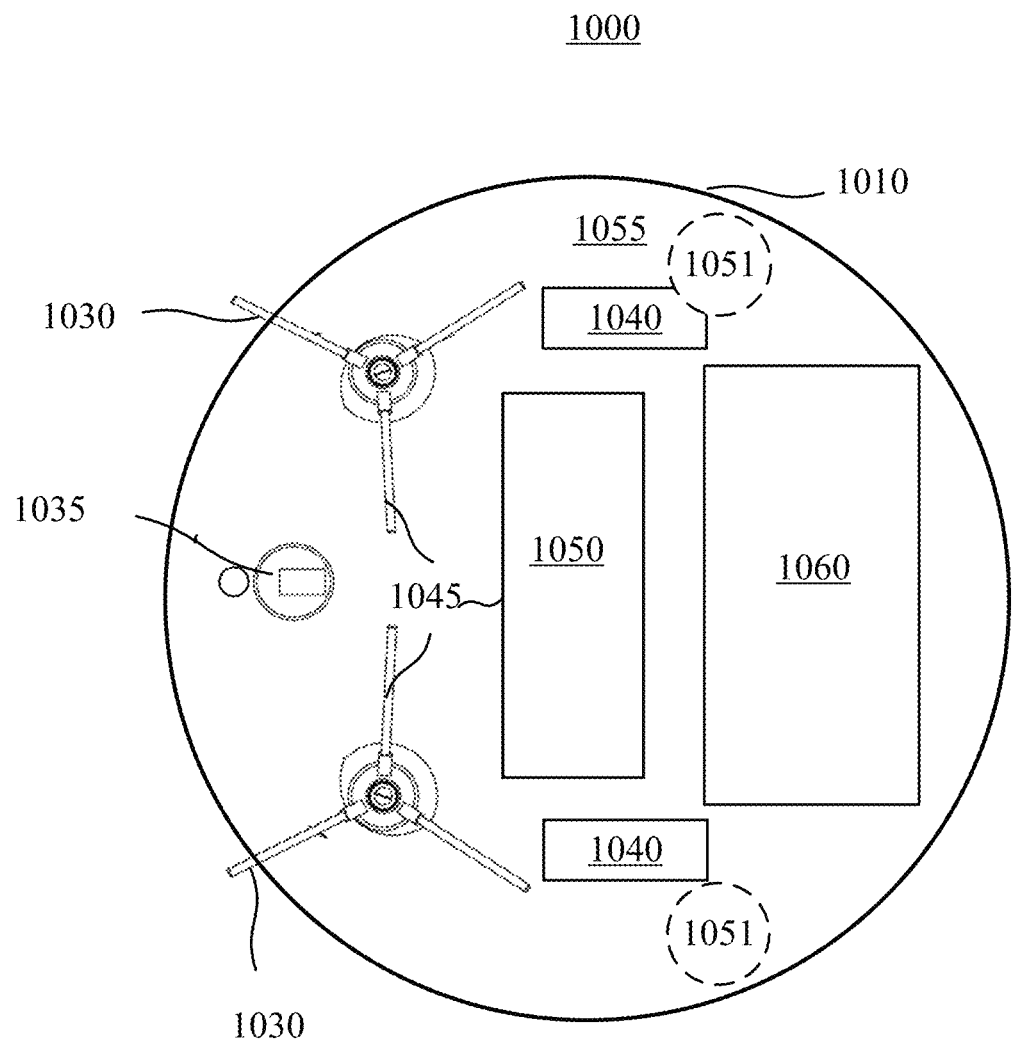
FIG. 13 illustrates a bottom plan view of the mobile device shown in FIG. 12, according to an embodiment of the present disclosure.

FIG. 13 is a schematic illustration of a bottom view of the structural configuration of the mobile device 1000, according to an embodiment of the present disclosure. Elements or structures shown in the bottom view are based on the mobile device 1000 being a cleaning device. The example mobile device 1000 is for illustrative purposes. In practice, the mobile device may include different structures, elements, etc. When the mobile device 1000 is another type of device, the elements and structures may be different. The bottom of the main body 1010 of the mobile device 1000 may include a bottom surface or plate 1055. In some embodiments, the bottom surface 1055 may be formed by a plurality of surfaces, although for illustrative purposes, the bottom surface 1055 is shown as a single piece. A sweeping unit 1045 may be mounted to the bottom surface 1055. The sweeping unit 1045 may include the side brushes 1030 and a main brush 1050 disposed at a relatively center location of the bottom surface 1055. The side brushes 1030 and/or the main brush 1050 may be mounted to the bottom surface 1055, or may be mounted to other components inside the mobile device 1000 and may extend out of the housing through an opening provided at the bottom surface 1055. Although not shown, in some embodiments, the main brush 1050 may be configured to sweep dirt or trash into a trash storage tank disposed inside the mobile device 1000, at a top portion, or a side portion of the mobile device 1000, or to sweep dirt or trash such that they may be vacuumed into a vacuum port.

The mobile device 1000 may include a motion assembly configured to enable the mobile device 1000 to move along a surface (e.g., a floor, a ground). The motion assembly may include a wheel assembly. The wheel assembly may include an omnidirectional wheel 1035 disposed at a front portion of the bottom surface 1055. The omnidirectional wheel 1035 may be a non-driving, passively rotating wheel. The wheel assembly may also include at least two driving wheels 1040 disposed at two sides (e.g., left and right sides) of the bottom surface 1055. The positions of the omnidirectional wheel 1035 and the two driving wheels 1040 may form a triangle, as shown in FIG. 13, to provide a stable support to the main body 1010 of the mobile device 1000. In some embodiments, the driving wheels 1040 may be rotatable around a rotation axis passing through a center of symmetry of the driving wheels 1040. In some embodiments, the driving wheels 1040 may not be rotatable around an axis perpendicular to the bottom surface 1055. The omnidirectional wheel 1035 may freely rotate around an axis perpendicular to the bottom surface 1055, and around an axis passing through a center of symmetry of the omnidirectional wheel 1035. The omnidirectional wheel 1035 and the driving wheels 1040 together move the mobile device 1000 in any desirable direction. The at least two driving wheels 1040 may be independently driven by at least two electric motors 1051 disposed inside the main body 1010. Although two motors 1051 are shown for illustrative purposes, in some embodiments, the at least two driving wheels 1040 may be driven by a single motor. The motors 1051 are parts of the motion assembly. When the two driving wheels 1040 are driven at different speeds, the rotation speed differential of the driving wheels 1040 may cause the mobile device 1000 to turn (i.e., spin at the same location or rotate while moving forward). In some embodiments, the driving wheels 1040 may be rotatable also around an axis perpendicular to the bottom surface 1055.

In some embodiments, the mobile device 1000 may include a mopping mechanism 1060 disposed at the bottom surface 1055. The mopping mechanism 1060 may include at least one movable mopping plate attached with a mop to mop the surface to be cleaned (e.g., a floor). For illustrative purposes, the mopping mechanism 1060 is shown as a rectangle in FIG. 13. The mopping mechanism 1060 may have any suitable shapes, such as a round shape, a square shape, a triangle shape, or a portion or a combination thereof. When the mobile device 1000 is another type of cleaning device, the mopping mechanism 1060 may be replaced by another suitable type of cleaning mechanism. The processor 1090 shown in FIG. 12 may control various components of the mobile device 1000, including the motion assembly, and the sweeping unit 1045, and the mopping mechanism 1060.

Referring to FIG. 1, FIG. 1 shows a schematic diagram of a structure of a mobile device 10, according to an embodiment of the present disclosure. The mobile device 10 may be an embodiment of any mobile device disclosed herein and shown in other figures, such as the mobile device 1000 shown in FIG. 12 and FIG. 13. As shown in FIG. 1, the mobile device 10 may include a motion assembly 11, a driving unit 12, a motion sensor 13 (in the figure, an odometer and an inertial measurement unit ("IMU") are used as examples of the motion sensor 13), an environment sensor 14, a processor 15, and a storage device 16. In some embodiments, the mobile device 10 may also include: a camera 17 (e.g., for capturing images of an environment in which the mobile device 10 moves or operates), a microphone 18 (e.g., for acquiring voice from the environment), a speaker 19 (e.g., for broadcasting sound to the environment), and a communication device 20 (e.g., for communicating with another device, such as a mobile phone, or a computer, such as a server, as shown in FIG. 1). Some similar components have been described above in connection with FIG. 12 and FIG. 13.

The motion assembly 11 may be configured to move the mobile device 10, which may include, for example, a wheel assembly or a track.

The driving unit 12 may be configured to drive the motion assembly 11 to run, which may be, for example, an electric motor.

The motion sensor 13 may be configured to acquire motion parameter information of the mobile device 10.

The motion parameter information may include at least one of a location, a displacement, a linear velocity, a linear acceleration, an angle, an angular velocity, or an angular acceleration of the mobile device 10.

The motion sensor 13 may include at least one of an odometer or an IMU. The IMU may include a gyroscope and an accelerometer. In some embodiments, the motion sensor 13 may also include one or more other types of displacement sensor, such as resistor-based displacement sensor, inductor-based displacement sensor, capacitor-based displacement sensor, strain-based displacement sensor, Hall effect based displacement sensor, etc. Based on characteristics of various motion sensors, various motion sensors can measure, or calculate based on measurements, one or more motion parameters such as, a location, a distance, a displacement, an angle, a velocity (linear and/or angular), and an acceleration (linear and/or angular), etc. In some embodiments, as shown in FIG. 1, using the odometer and the IMU as example motion sensors, the odometer may obtain the distance of movement, the linear velocity, and the angular velocity, and may then obtain an angle based on integration of the angular velocity. The IMU may obtain the linear acceleration, the angular acceleration, and may then obtain the linear velocity and angle based on integration of the linear acceleration and the angular acceleration, respectively. The motion parameter information obtained by the odometer and the IMU may be complimentary to each other, may correct each other, thereby improving the accuracy of the motion parameter data. The odometer may be disposed on the motion assembly 11 or may be connected with the motion assembly 11. The IMU may obtain the motion parameters when the IMU moves together with the mobile device 10. Thus, the IMU may be disposed at an outer housing or any other part that moves together with the mobile device 10. The IMU need not be connected with the motion assembly 11.

The environment sensor 14 may obtain obstacle information within a work zone, such as an obstacle location and/or the distance between an obstacle and the mobile device 10.

The original meaning of the term "obstacle" may include any other object in the work zone except for the mobile device 10 (the obstacle differs from the traversable zones or space in the work zone). However, because the mobile device 10 may not have the object recognition capability of a human, the mobile device 10 may only be able to sense external obstacles through physical contact, receiving electromagnetic wave that is reflected from an obstacle, and ultrasonic wave, etc. Moreover, only the map showing the objects that obstruct the movement of the mobile device 10 can provide meaningful instructions for subsequent movement of the mobile device 10. Therefore, the concept of the "obstacle" in the present disclosure is defined as being an object that obstructs the movement of the mobile device 10 within a work zone where the mobile device 10 operates. For example, an animal, a human, and/or non-living objects in a work zone that may occupy a traversable zone of the mobile device 10 (hence may obstruct the movement of the mobile device) may include: a wall, a door, a furniture, a pet, a user, etc. Objects that allow the mobile device 10 to move underneath (i.e., there is a space underneath the objects that allow the mobile device 10 to move in and out), such as a bed, a table, a closet and other furniture with a space underneath are not deemed to be obstacles in the present disclosure, because these objects do not obstruct the movement of the mobile device 10 (although the support legs of the furniture may obstruct the movement of the mobile device 10, and hence are obstacles based on the definition in the present disclosure).

The processor 15 may be electrically connected with the storage device 16. The storage device 16 may store computer-readable instructions. The processor 15 may retrieve the computer-readable instructions, and may execute the instructions to perform the method for processing the map of the closed space according to various embodiments of the present disclosure. For example, the processor 15 may determine the outer profile and/or inner profile, and/or processing the map of the closed space based on the outer profile.

The work zone in the present disclosure refers to at least a portion of a closed space in which the mobile device 10 operates, or at least a portion of a zone or multiple zones of the closed space. In general, the obstacle in the work zone that corresponds to the outer profile is a non-traversable obstacle located at an edge of a traversable zone or at an intersection of multiple zones, such as, a wall, a closed door, a furniture fixedly disposed at the edge of the traversable zone or furniture that is hard to move (e.g., a sofa, a TV cabinet, a floor cabinet, etc.), or home appliances (e.g., an air conditioner, a refrigerator, etc.); the obstacle on the outer profile and/or the outer profile may be categorized as "outside boundary" type obstacles; the obstacle in the work zone that corresponds to the inner profile is an obstacle located within a traversable zone, such as the legs of a table or chair, a trash can, a dropped toy, a human, an animal, etc., that are located in the work zone. Such obstacles may be categorized as "inside boundary" type obstacles.

It should be understood that the processor 15 can both performing the method for processing the map of the closed space, and performing other operations. For example, the processor 15 may create a map, perform path planning based on the created map or a map that has been processed. In some embodiments, the processor 15 may trigger the mobile device 10 to perform other tasks. For example, the processor 15 may trigger the mobile device 10 to perform closed-loop detection, etc. The data, information, and programs that are used by the processor 15 may be stored in the storage device 16, and may be retrieved from the storage device 16. The processor 15 may also store the data, information that have been processed in the storage device 16. for example, the processor 15 may retrieve a map (or map data) from the storage device 16. In some embodiments, the processor 15 may store the created map and/or the map that has been processed into the storage device 16. The present disclosure does not limit the retrieval and/or storage of various types of the data or information between the processor 15 and the storage device 16. The processor 15 may include one or more of a micro-control unit ("MCU"), a digital signal processor ("DSP"), a field programmable gate array ("FPGA"), and a graphics processing unit ("GPU"), or may be other types of various hardware chips, processors that have data processing and computation capabilities, or may be a software algorithm. The present disclosure does not limit the types and forms of the processor 15. The processor in the present disclosure is a general term, which may be an integral, specially-designed or programmed processor of the mobile device 10, or may be a collection of multiple processing units. For example, the processor may include a first processing unit of a master computer and a second processing unit of a chassis. In this situation, the first processing unit and the second processing unit as a whole realize various functions of the processor. The present disclosure does not limit the number of the processing units, the connection manners of multiple processing units, and the allocation of the functions and computational capabilities. The storage device may be a random-access-memory ("RAM"), a read-only memory ("ROM"), etc., or may be an element and/or device that has a storage function and is remotely connected with a cloud/server/mobile terminal through wired or wireless connections.

Figure 2:
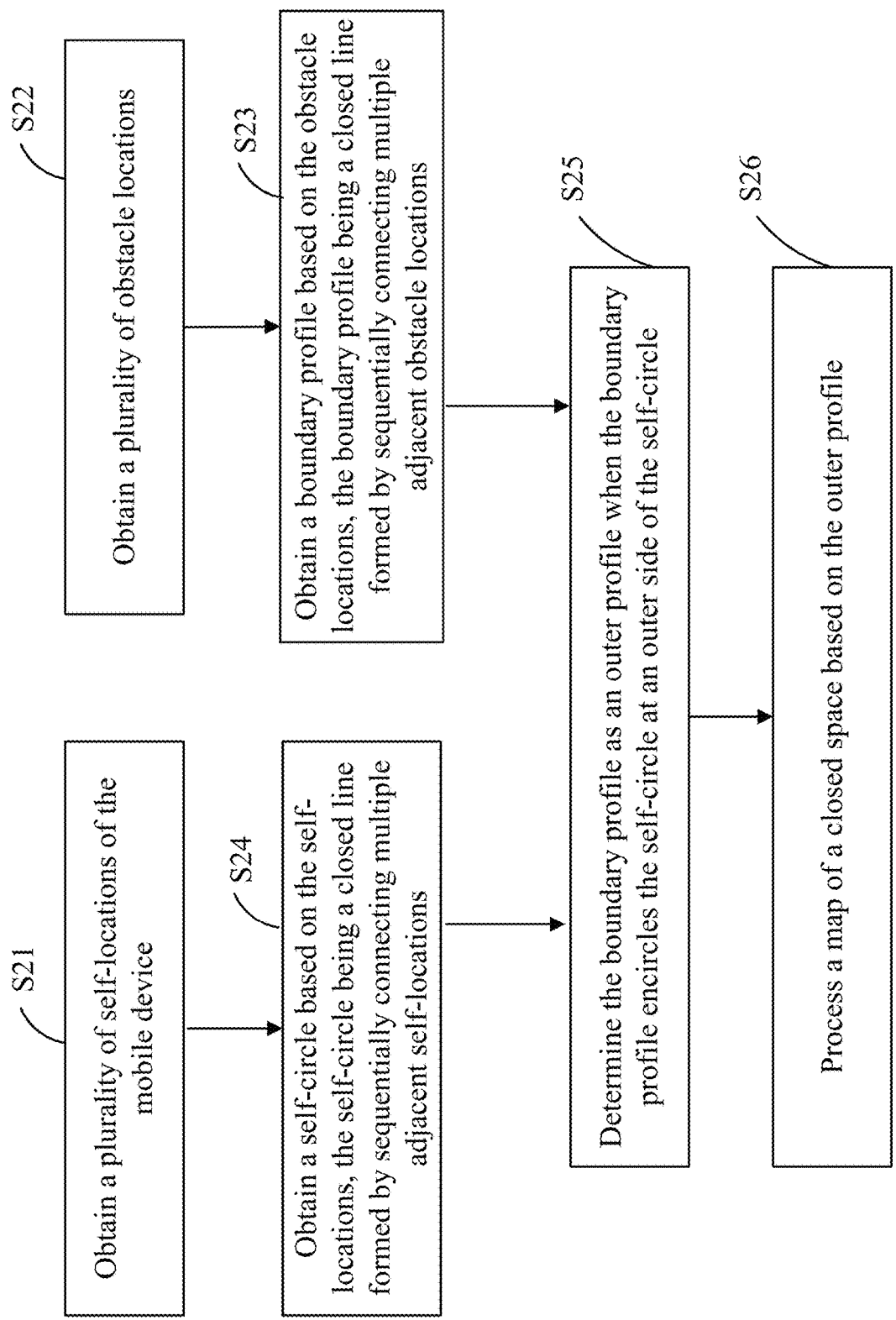
FIG. 2 illustrates a flowchart showing a map building method, according to an embodiment of the present disclosure.

Before performing a task, during the process of performing a task, and/or after performing a task, the mobile device 10 may process a map of a closed space. In some embodiments, as shown in FIG. 2, the method for processing the map of the closed space may include:

S21: obtaining a plurality of self-locations of the mobile device 10.

With reference to the structure shown in FIG. 1, the mobile device 10 may obtain motion parameter information through the one or more motion sensors 13. The motion parameter information may include at least one of a location, a displacement, a distance, a linear velocity, a linear acceleration, an angle, an angular velocity, and an angular acceleration. The various types of motion parameter information may include relative parameters and/or absolute parameters (e.g., relative distance and/or absolute distance, relative location and/or absolute location).

The self-location of the mobile device 10 (also referred to as a trajectory point of the mobile device 10) may be obtained directly from the motion parameter information. For example, the motion parameter information may include a location (or referred to as coordinate location). In some embodiments, the self-location may also be obtained from calculation based on the motion parameter information. For example, the self-location may include a direction determined based on an initial location in an absolute coordinate system set in the mobile device 10, and an angle obtained based on integration of an angular velocity acquired by the gyroscope in the IMU. As another example, a displacement of the mobile device 10 relative to the initial location may be obtained through a wheel encoder and/or an optic flow sensor, and a self-location at a specific time instance may be obtained by adding a vector of the initial location in the absolute coordinate system and the displacement of the mobile device 10 relative to the initial location. In some embodiments, a distance from the mobile device 10 to an obstacle having known coordinate locations may be directly detected by the environment sensor 14, such as a light detection and ranging ("Lidar") sensor. The distance may include a magnitude of the relative distance between the mobile device 10 and the obstacle and a direction of the mobile device 10 relative to the obstacle. The self-location of the mobile device 10 at a specific time instance may be calculated based on the known location of the obstacle and the relative distance between the mobile device 10 and the obstacle. In some embodiments, the self-location of the mobile device 10 may be calculated based on a vSLAM algorithm, and based on a displacement measured by the odometer, the parameters measured by the IMU, such as the velocities and angle.

S22: obtaining a plurality of obstacle locations.

The process of obtaining a plurality of obstacle locations may include:

continuously detecting obstacles while the mobile device 10 moves in the work zone, and calculating obstacle locations based on the parameters of the mobile device 10 and the self-locations of the mobile device 10 when detecting the obstacles; and/or, continuously detecting obstacles while the mobile device 10 moves in the work zone, and detecting distance information relating to the obstacles, and calculating the obstacle locations based on the distance information relating to the obstacles and the self-locations of the mobile device 10 when detecting the obstacles; and/or, continuously detecting obstacles while the mobile device 10 moves in the work zone, obtaining obstacle locations through detection; and/or obtaining obstacle locations based on a historical map.

When the mobile device 10 moves in the work zone, the mobile device 10 may continuously detect the self-locations and the obstacle locations, thereby obtaining a plurality of self-locations and a plurality of obstacle locations. It should be noted that because the detection of the obstacles is discrete in time, and is not actually continuous, the phrase "continuously" detecting the obstacles refers to detecting multiple obstacles multiple times at a certain frequency within a predetermined time interval.

Figure 4:
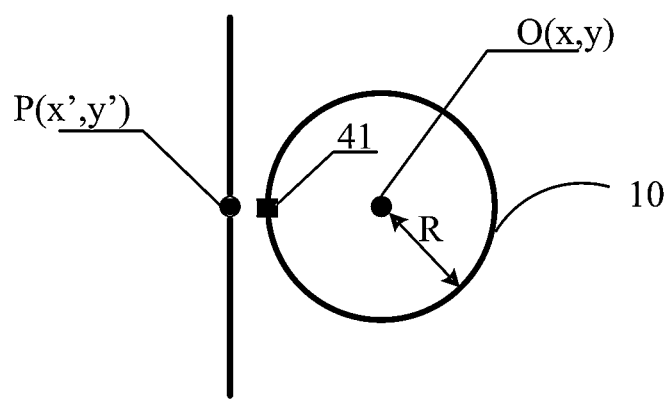
FIG. 4 illustrates a schematic diagram showing determination of an obstacle location when the mobile device moves in a boundary-following mode, according to an embodiment of the present disclosure.

An obstacle location may be calculated based on the parameters of the mobile device 10 and the self-location of the mobile device 10 when detecting the obstacle. For example, the obstacle location may refer to an outside boundary location (or edge location) of the obstacle at a side facing the mobile device 10. For example, when the mobile device 10 moves in a boundary-following mode (or edge-following mode), one or more proximity sensors mounted at various locations of the sides of the mobile device 10 continuously sense one or more obstacles located within a predetermined distance (e.g., 6 cm) or within a predetermined distance range (e.g., 6 cm to 8 cm) from the mobile device 10, and the mobile device 10 moves along the outside boundary of an obstacle. The proximity sensor may include, for example, infrared emitting diode or time of flight ("TOF") sensors. Referring to FIG. 4, under the boundary-following mode, assuming that a proximity sensor 41 is located at the left side surface of the mobile device 10, the proximity sensor 41 may maintain continuous sensing of obstacles within e.g., 6 cm, from the left side surface of the mobile device 10. Assuming that the mobile device 10 can be represented as a circle within a two-dimensional plane, the radius of the circle is denoted as R, the self-location of the mobile device 10 may be represented by the location of the center point O of the mobile device 10. If the coordinates of the self-location O of the mobile device 10 can be represented by (x, y), then the coordinates of the obstacle location P corresponding to the self-location may be represented as (x', y')=(x'-R-6, y').

In some embodiments, an obstacle location may be calculated based on distance information relating to an obstacle and the self-location of the mobile device 10 when detecting the obstacle. For example, the distance between the obstacle and the mobile device 10 may be detected by any suitable distance measuring sensor, such as a Lidar sensor, an ultrasonic wave sensor, a depth vision camera, an ordinary binocular or multi-ocular camera. For example, referring to FIG. 5, the mobile device 10 may detect multiple obstacle locations (each associated with an obstacle) represented by, e.g., P1 to P11. The distance between the mobile device 10 to each obstacle may be detected by the distance measuring sensor (e.g., Lidar sensor). The distance may include length information and angle information. The length information may be represented by L1 to L11. An obstacle location may be calculated based on the self-location of the mobile device 10 and the detected distance. For example, corresponding to P1, the obstacle location may be represented by (x1, y1). Assuming the self-location of the mobile device 10 is represented by (x, y), the distance between the mobile device 10 and P1 is represented by (L1, θ1). θ1 is the angle formed by the straight line on which L1 is located and the positive direction of the x-axis, then:

$$(x1,y1)=(x-L1\times\cos(\pi-\theta1), y+L1\times\sin(\pi-\theta1))=(x+L1\times\cos(\theta1), y+L1\times\sin(\theta1)).$$

Coordinates of the obstacle locations P2 to P11 can be similarly calculated, which are not repeated.

It should be understood that the distance information is not limited to the distance between the mobile device 10 and an obstacle. The distance information may also include a distance between the obstacle and a reference object. The location of the reference object may be fixed or may be obtained from calculation. For example, the location of the reference object may be a fixed value, and may be set in the mobile device 10 (e.g., in the storage device of the mobile device 10, such as a memory). After the location of the reference object is determined or configured, each obstacle location may be calculated based on the location of the reference object and the detected distance between the reference object and the obstacle.

In some embodiments, the following method may be used to obtain an obstacle location: with reference to the structure shown in FIG. 1, the mobile device 10 may obtain obstacle information of obstacles in the work zone through the environment sensor 14. The obstacle information may include locations of obstacles. Typically, a location of the obstacle may be represented by coordinates under an absolute coordinate system set in the mobile device 10 or under a relative coordinate system. The absolute coordinate system may be a fixed coordinate system using a certain point in the work zone as the origin, and may also be referred to as a global coordinate system. The relative coordinate system may be set using the mobile device 10 as the origin, using the moving direction of the mobile device 10 as the positive direction of the x-axis or the y-axis, and is moving together with the mobile device 10. The relative coordinate system may also be referred to as a regional coordinate system. The coordinates representing the location of the obstacle may also be referred to as coordinate location. The coordinates may be a Cartesian coordinate system, a polar coordinate system, or a cylindrical coordinate system. The obstacle information may also include the distances between the mobile device 10 and the obstacles, the distances between a specific obstacle and other obstacles, a location of a special obstacle (e.g., the reference object), features of the obstacles, size of the obstacles, and/or spatial distribution of the obstacles. Using obstacle location as an example, if the environment sensor of the mobile device 10 is an ordinary monocular camera, the mobile device 10 may capture multiple images having the same features during movement, and may calculate the obstacle location based on the captured multiple images using a triangulation method and VSLAM algorithms, motion parameter information from the wheel encoder and IMU. If the obstacle information detected by the mobile device 10 includes the obstacle locations, then the obstacle locations may be directly obtained from the detected obstacle information.

In some embodiments, obtaining obstacle locations from a historical map may be achieved by the following process: first, the mobile device 10 may retrieve the historical map. Because the historical map typically marks the obstacle locations or records the coordinate locations of the obstacle locations, the obstacle locations may be directly obtained from the historical map.

It should be understood that steps S21 and S22 can be performed in any sequence, as these steps do not have temporal correlations. Thus, the present disclosure does not limit the sequence of executing steps S21 and S22.

S23: obtaining a boundary profile based on the obstacle locations, the boundary profile being a closed line formed by sequentially connecting multiple adjacent obstacle locations.

S24: obtaining a self-circle based on the self-locations, the self-circle being a closed line formed by sequentially connecting multiple adjacent locations of the mobile device 10.

S25: determining the boundary profile as an outer profile when the boundary profile encircles the self-circle at an outer side of the self-circle.

Figure 3A:
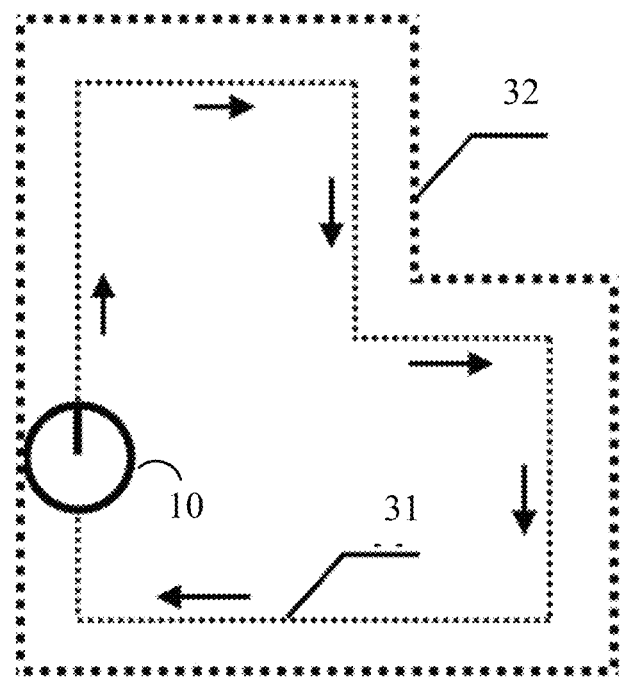
FIGS. 3A-3C illustrate a self-circle and a boundary profile formed after the mobile device moves in a boundary-following mode, according to an embodiment of the present disclosure.
Figure 3B:
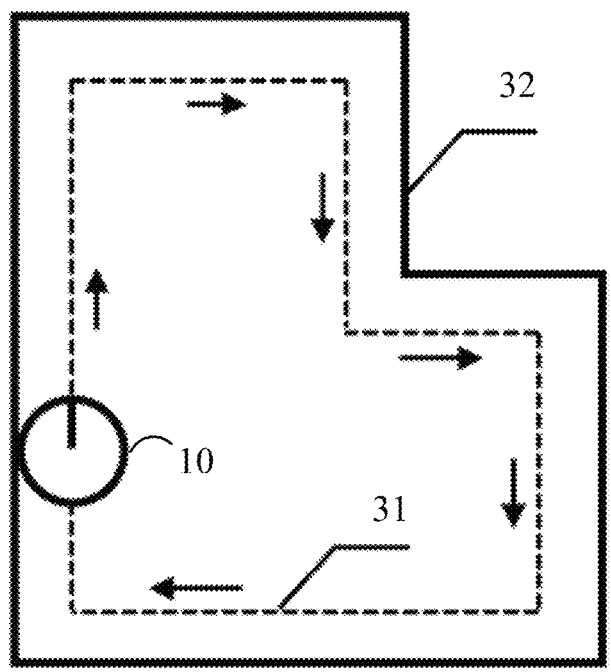

For example, referring to FIG. 3A, FIG. 3B, when the mobile device 10 moves in the work zone, the closed line formed by multiple adjacent self-locations is referred to as a self-circle 31. The closed line formed by multiple adjacent obstacle locations is referred to as a boundary profile (for differentiation, the boundary profile shown in FIG. 3A and FIG. 3B is referred to as a first boundary profile 32). Because the first boundary profile 32 encircles the self-circle 31 at an outer side of the self-circle 31, the first boundary profile 32 is referred to as an outer profile. The display form of the outer profile is not limited by the present disclosure. For example, in FIG. 3A, the outer profile is shown in dotted lines. In FIG. 3B, the outer profile is shown in solid lines. The outer profile may be stored, in the form of data group/data set (which may include the coordinates of each point on the outer profile), in a storage medium, such as a computer-readable storage medium, a storage unit, etc.

Figure 3C:
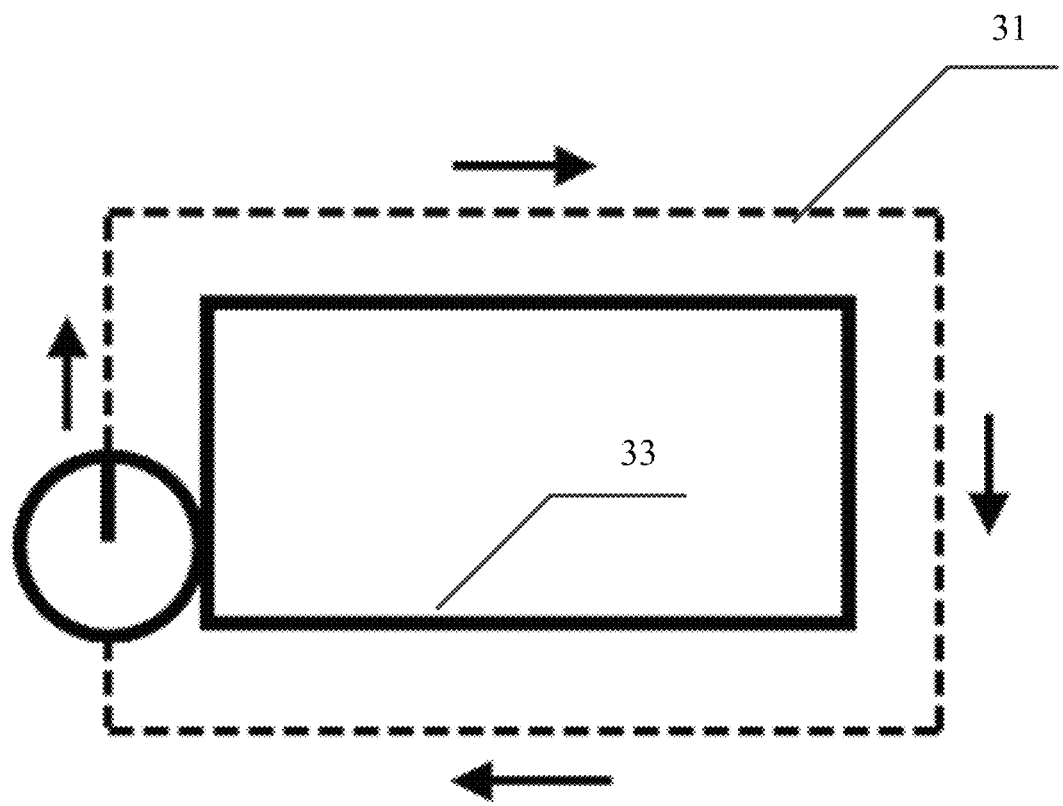

Correspondingly, in some embodiments, the outer profile may also exist in the map. For example, referring to FIG. 3C, when the mobile device 10 moves in the work zone, similar to the above descriptions, the close line formed by multiple self-locations is referred to as the self-circle 31, the closed line formed by multiple adjacent obstacle locations is referred to as a boundary profile. To differentiate the embodiment shown in FIG. 3A and FIG. 3B, the boundary profile shown in FIG. 3C is referred to as a second boundary profile 33. As shown in FIG. 3C, the self-circle 31 encircles the second boundary profile 33 at an outer side of the boundary profile 33. Thus, the second boundary profile 33 is referred to as an inner profile.

The term "multiple adjacent" locations (including the multiple adjacent self-locations of the mobile device 10 and/or the multiple adjacent obstacle locations) may be selected based on a predetermined adjacent locations filtering condition, such as selecting a location at a predetermined time interval (e.g., 50 ms) and/or at a predetermined distance interval (e.g., 3 cm or 5 pixels on the map). Using selecting multiple self-locations of the mobile device 10 based on the predetermined time interval as an example, assuming the predetermined time interval is T, a current location X1 of the mobile device 10 may be selected at time T1, at time T1+T, another current location X2 of the mobile device 10 may be selected. At time T1+2T, another current location X3 of the mobile device 10 may be selected. Sequentially connecting X1, X2, and X3 may form a closed line as a self-circle. Using forming a boundary profile by selecting multiple adjacent obstacle locations at a predetermined time interval as an example, during the movement of the mobile device 10, at each time when an obstacle location is recorded, time parameter corresponding to the time instance when the obstacle location is detected is also recorded. The time parameter may be an absolute time when the obstacle is detected, or a time interval between the time instance when the obstacle is detected and a previous time instance when another obstacle (or another portion of the same obstacle) is previously detected. Any two obstacle locations are connected when the time interval between detection of the two obstacles is smaller than a predetermined time interval threshold or satisfies a predetermined time interval function. Connecting the obstacle locations forms a closed line, referred to as the boundary profile. When selecting multiple adjacent obstacle locations based on the predetermined distance interval, distances between each obstacle location and other obstacle locations are calculated. When a distance between two obstacle locations is smaller than a predetermined obstacle distance interval threshold or satisfies a predetermined obstacle distance interval function, the two obstacle locations are connected. Connecting the obstacle locations forms a closed line, referred to as the boundary profile. Using the distance between two obstacle locations as a condition to determine whether the two obstacle locations are to be connected is merely an example. In some embodiments, the condition may be adjacent three obstacle locations satisfying a predetermined function relationship. For example, assuming E1, E2, and E3 are three obstacle locations. E1 and E2, E2 and E3 satisfy a predetermined distance relationship respectively, then a secondary filter condition may be set for determining the distance relationship between E1 and E3. For example, the secondary filter condition may be the distance between E1 and E3 being smaller than a predetermined secondary distance threshold, or the three locations E1, E2, and E3 all satisfy a predetermined functional relationship. In some embodiments, the condition for selecting the obstacle locations may be more than three obstacle locations satisfying a predetermined filtering relationship or functional relationship. For the self-circle formed by connecting the multiple self-locations of the mobile device 10, because the multiple self-locations of the mobile device 10 are continuous in time, i.e., there is a temporal relationship in the time instances corresponding to the multiple self-locations on the moving trajectory of the mobile device 10, the self-circle may be formed by sequentially connecting multiple adjacent self-locations of the mobile device 10 selected based on the above-described predetermined time interval. The self-circle of the present disclosure can be formed by connecting multiple self-locations based on the temporal relationship between the multiple self-locations. The multiple self-locations forming the self-circle are adjacent self-locations. In some embodiments, the self-circle may be formed by selecting and sequentially connecting multiple adjacent self-locations of the mobile device 10 based on the above-described "adjacent locations filtering condition" using a predetermined distance interval.

For the mobile device 10, when detecting the self-locations at different time instances, the mobile device 10 may return to the same previously detected location. For example, at time instance t1, the mobile device 10 detects a self-location at point C. After moving for a time period, at time instance t2 the self-location detected by the mobile device 10 returns to the point C detected at time instance t1. Sequentially connecting the self-locations of the mobile device 10 detected between the time instance t1 and the time instance t2 forms a closed line, referred to as the self-circle. Similarly, when detecting the obstacle locations at different time instances, the mobile device 10 may again detect the same obstacle location previously detected. For example, at time instance t3 the mobile device 10 detects that an obstacle at a point D, i.e., point D is an obstacle location. After moving for a time period, at time instance t4 the obstacle location detected by the mobile device 10 is the same obstacle location D that has been previously detected. Sequentially connecting the multiple obstacle locations detected by the mobile device 10 between the time instances t3 and t4 forms a closed line. Alternatively, multiple adjacent obstacle locations may be selected from the obstacle locations detected between the time instances t3 and t4 based on the above-described adjacent locations filtering condition using a distance interval. The selected obstacle locations may be sequentially connected to form the closed line. The closed line is referred to as a boundary profile. For example, when the mobile device 10 moves in a boundary-following mode, referring to FIG. 3A to FIG. 3C, the multiple adjacent self-locations detected by the mobile device 10 may be sequentially connected to form the self-circle 31, and the multiple adjacent obstacle locations may be sequentially connected to form the boundary profile (e.g., the first boundary profile 32 and/or the second boundary profile 33).

Figure 5:
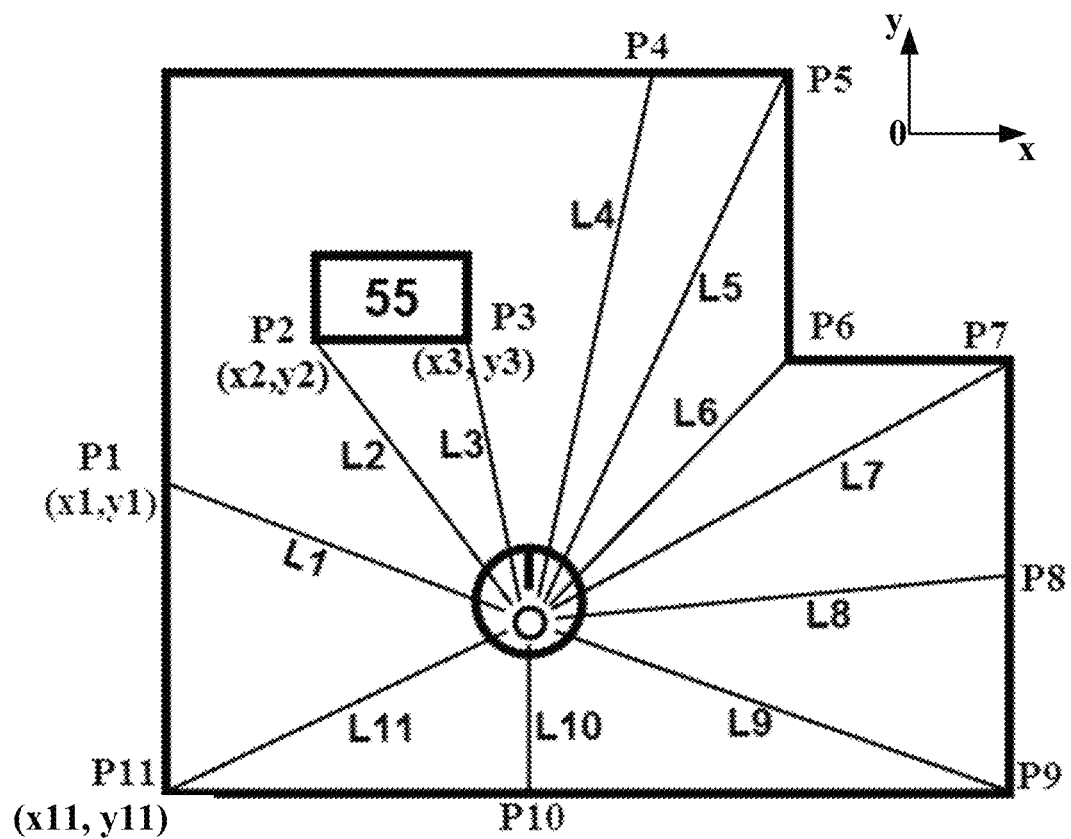
FIG. 5 illustrates a schematic diagram showing determination of an obstacle location through detecting a distance between the mobile device and the obstacle, according to an embodiment of the present disclosure.
Figure 6A:
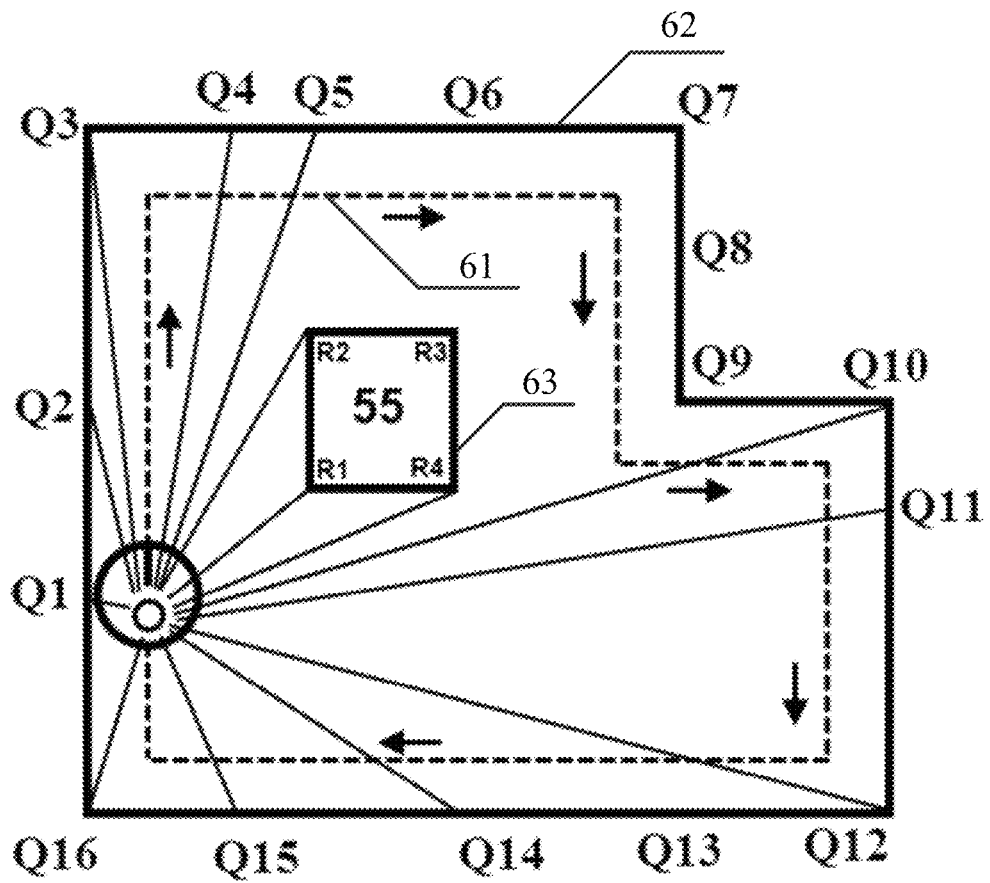
FIGS. 6A-6C illustrate a self-circle and a boundary profile formed when the mobile device detects a distance between the mobile device and the obstacles during movement, according to an embodiment of the present disclosure.
Figure 6B:
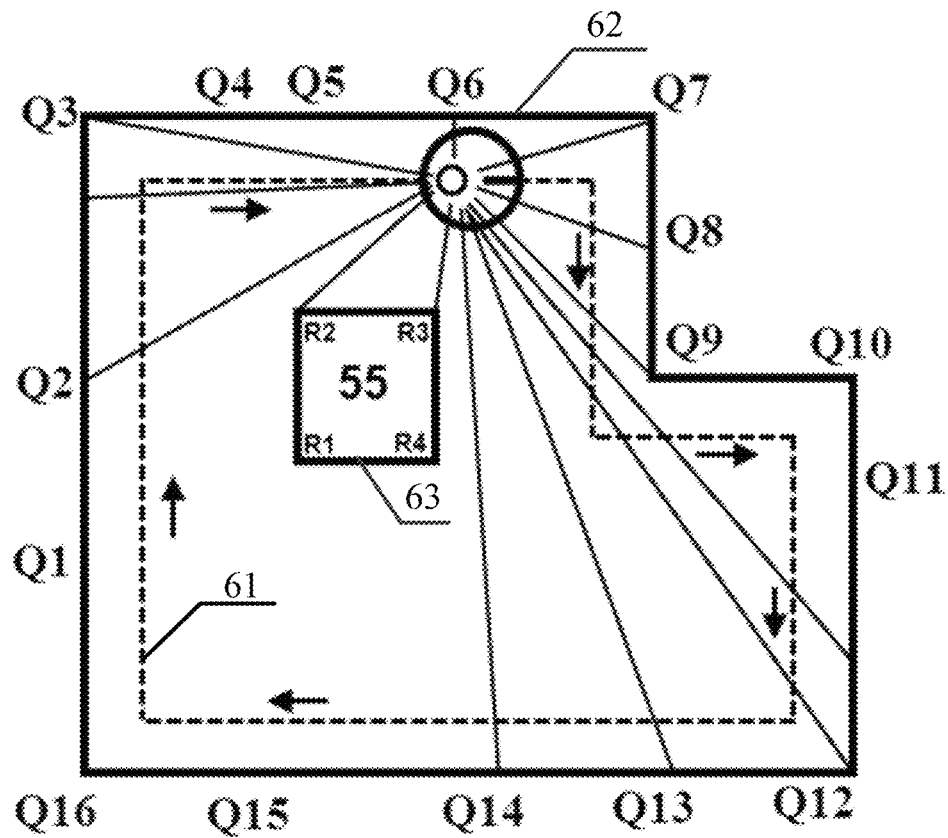
Figure 6C:
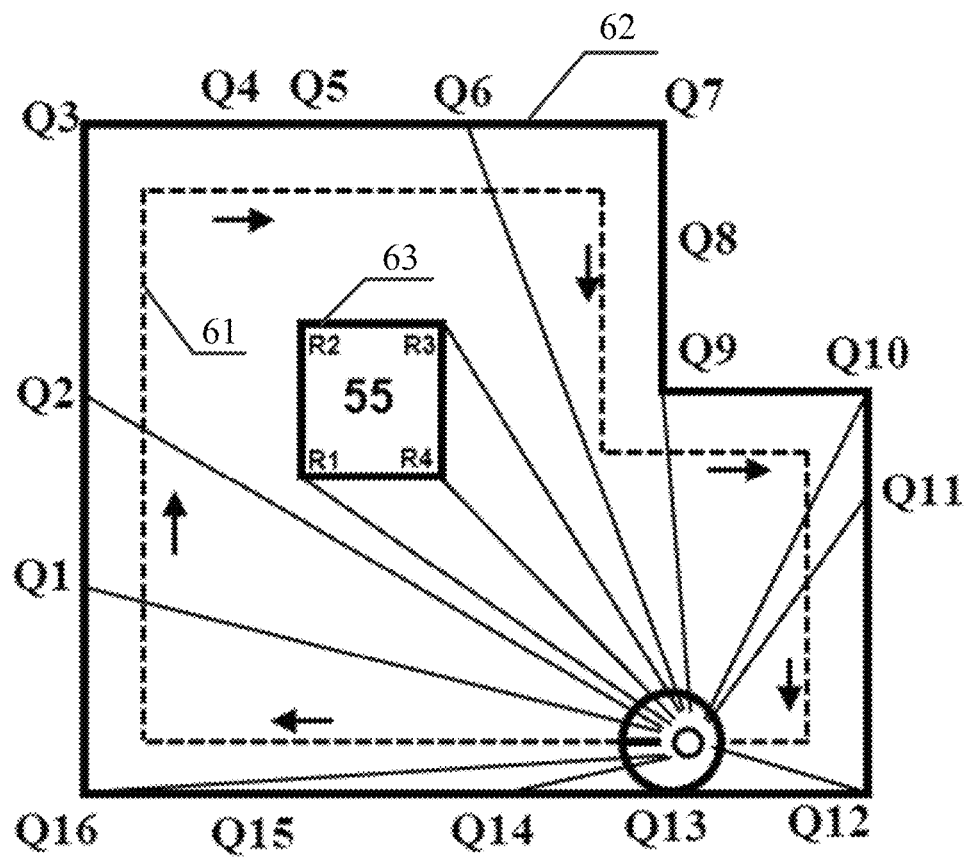

When a distance measuring sensor, such as a Lidar sensor, is used to detect the distance between the mobile device 10 and the obstacle, because the obstacle may obstruct the straight transmission of the detecting light (if an ultrasonic wave sensor is used to detect the distance, then the ultrasonic wave may be obstructed by the obstacle), the actual distances between multiple obstacle locations that are detected at adjacent time instances may exceed a predetermined distance interval range or a distance interval threshold. As a result, multiple adjacent obstacle locations satisfying the above-described "adjacent locations filtering condition" may not be found, and a closed line may not be formed. As such, the boundary profile may not be formed. For example, as shown in FIG. 5, although obstacle locations P3 and P4 are detected at adjacent time instances in a time interval, because the actual distance is too large, the adjacent locations filtering condition is not satisfied, and P3 and P4 are not adjacent obstacle locations. Therefore, typically, multiple rounds of distance measurement may be performed during the movement of the mobile device 10. When the self-locations are changed, the obstacle locations are measured multiple times (e.g., two times, three times, etc.). Comparing the obstacle locations detected at multiple times, multiple adjacent obstacle locations that satisfy the adjacent locations filtering condition may be found, thereby increasing the chance of forming the boundary profile. For example, referring to FIG. 6A to FIG. 6C, the mobile device 10 moves in a work zone. During the movement, the mobile device 10 may continuously perform self-positioning (i.e., continuously determine the location of the mobile device 10) to obtain the self-locations, and may detect the distances between each self-location and multiple obstacles in the surrounding environment. For example, as shown in FIG. 6A to FIG. 6C, when the mobile device 10 moves from near point Q1 (FIG. 6A) to near point Q6 (FIG. 6B), and then moves to near point Q13 (FIG. 6C), the mobile device 10 may obtain the distances between the mobile device 10 and the obstacles in the surrounding environment by rotating a laser-based radar (e.g., a Lidar sensor) 360° according to a predetermined frequency (e.g., 3 to 10 Hz). For example, near point Q1, the Lidar sensor of the mobile device 10 detects obstacle locations Q1 to Q5, R1, R2, R4, Q10 to Q16, but may not detect obstacle locations Q6 to Q9 and R3. In addition, Q5 and R2 which are adjacent in time interval, the distance is relatively large, and hence do not satisfy the "adjacent locations filtering condition" using a distance interval. Thus, Q5 and R2 are not adjacent obstacle locations. Likewise, R4 and Q10 are not adjacent obstacle locations. When the mobile device 10 moves to near Q6, as shown in FIG. 6B, the Lidar sensor of the mobile device 10 may detect obstacle locations Q2 to Q14, and R2, R3, R4, but may not detect obstacle locations Q1, Q14 to Q16, and R1. Likewise, Q2 and R2, and Q14 and R3 may not be adjacent obstacle locations. When the mobile device 10 moves to near Q13, as shown in FIG. 6C, the Lidar sensor of the mobile device 10 may detect obstacle locations Q1, Q2, Q6 to Q16, and R1, R3, R4, but may not detect obstacle locations Q3 to Q5 and R2. Likewise, Q2 and R1, and Q6 and R3 are not adjacent obstacle locations. However, combining obstacle locations obtained from the surrounding environment at any two self-locations of the three self-locations near the three obstacle locations Q1, Q6, and Q13, all obstacle locations (Q1 to Q15 and R1 to R4 of an obstacle 55) in the work zone may be obtained as shown in FIG. 6A to FIG. 6C. Based on the "adjacent locations filtering condition" using a distance interval, multiple adjacent obstacle locations may be found. Sequentially connecting the multiple obstacle locations may form a closed line, i.e., the boundary profile. For example, a boundary profile may be formed by sequentially connecting Q1 to Q16, another boundary profile may be formed by sequentially connecting R1 to R4. A boundary profile may be determined as an outer profile or an inner profile based on a relative location relationship between the boundary profile and a self-circle 61. An outer profile is a boundary profile that encircles the self-circle at an outer side of the self-circle. For example, the boundary profile formed by sequentially connecting Q1 to Q16 is an outer profile. If the self-circle encircles a boundary profile at an outer side of the boundary profile, the boundary profile is an inner profile. For example, the boundary profile formed by sequentially connecting R1 to R4 is an inner profile.

In practical processing, the time interval and/or the distance interval may be selected in a reasonable manner. In some embodiments, the formed self-circles and/or boundary profiles may be filtered or selected (e.g., using image processing algorithms) to minimize errors in the self-circles and/or boundary profiles.

Figure 7:
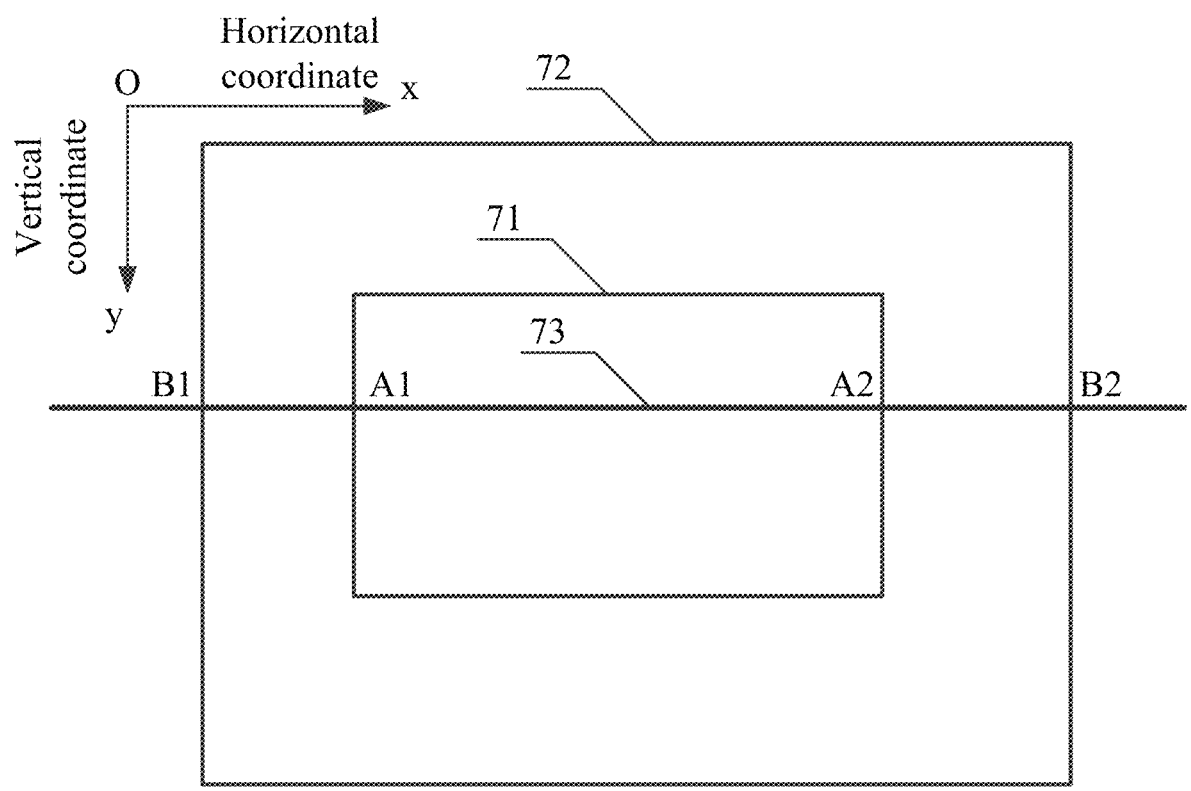
FIG. 7 is a schematic diagram showing determination of whether the boundary profile is located at an outer side of the self-circle, according to an embodiment of the present disclosure.

Any suitable algorithm may be used to determine whether the boundary profile is located at an outer side of the self-circle. In some embodiments, the mobile device 10 may obtain a map that records a self-circle 71 and a boundary profile 72. As shown in FIG. 7, first, a map coordinate system may be established in FIG. 7. For example, a certain point at the left up corner may be used as the coordinate origin of the map coordinate system, the positive x-axis may be the direction to the right, and the positive y-axis may be the downward direction. The coordinate values of the x-axis may be the horizontal axis coordinates, and the coordinate values of the y-axis may be the vertical coordinates. A scanning may be performed to scan each of the pixel points in the map in multiple rows in the x-axis and/or in multiple columns in the y-axis. Scanning the pixel points in the map in multiple rows in the x-axis may be referred to as row scanning. Scanning the pixel points in the map in multiple columns in the y-axis may be referred to as column scanning. During the process of row scanning or column scanning, the relative location relationship between the boundary profile and the self-circle may be determined based on the sequence or order of the points on the boundary profile and points on the self-circle that are found in the scanning. For example, in the row scanning, multiple rows in parallel with the x-axis may be selected. Assuming that the row currently being scanned is a row scanning line 73 in FIG. 7, scanning may be performed from left to right along the row scanning line 73 (x value is from small to large, but x may not start from 0, it may start with a negative value). The following crossing points may be sequentially determined: a first crossing point B1 between the row scanning line 73 and the boundary profile 72, a first crossing point A1 between the row scanning line 73 and the self-circle 71, a second crossing point A2 between the row scanning line 73 and the self-circle 71, and a second crossing point B2 between the row scanning line 73 and the boundary profile 72. That is, the horizontal coordinate of the crossing point A1 between the row scanning line 73 and the self-circle 71 is greater than the horizontal coordinate of the crossing point B1 between the row scanning line 73 and the boundary profile 72. The horizontal coordinate of the crossing point A2 between the row scanning line 73 and the self-circle 71 is smaller than the horizontal coordinate of the crossing point B2 between the row scanning line 73 and the boundary profile 72. In other words, the crossing points between the row scanning line 73 and the boundary profile 72 are all located at an outer side of the self-circle 71. If scanning along multiple selected row scanning lines all lead to the same conclusion, then it can be determined that the boundary profile 72 encircles the self-circle 71 at an outer side of the self-circle 71. The boundary profile may be determined as an outer profile. Conversely, if scanning along multiple selected row scanning lines all lead to the opposite conclusion, then it can be determined that the self-circle encircles the boundary profile at an outer side of the boundary profile, and the corresponding boundary profile is an inner profile. That is, for the crossing points A1 and A2 between the row scanning line and the self-circle, and the crossing points B1 and B2 between the row scanning lien and the boundary profile, the opposite conclusion is that the horizontal coordinate of the crossing point A1 between the row scanning line and the self-circle is smaller than the horizontal coordinate of the crossing point B1 between the row scanning line and the boundary profile, and the horizontal coordinate of the crossing point A2 between the row scanning line and the self-circle is greater than the horizontal coordinate of the crossing point B2 between the row scanning line and the boundary profile. Likewise, a relative location relationship between the boundary profile and the self-circle may be determined from the column scanning, and accordingly the boundary profile may be determined as an outer profile or an inner profile, the process of which is not repeated.

Based on the above algorithm, the first boundary profile 32 shown in FIG. 3A to FIG. 3C may be determined as an outer profile, the second boundary profile 33 may be determined as an inner profile, the first boundary profile 62 shown in FIG. 6A to FIG. 6C may be determined as the outer profile, and the second boundary profile 63 may be determined as an inner profile.

The present disclosure does not limit the temporal order of steps S21 and S22, and does not limit the temporal order of steps S23-S25. That is, the present disclosure does not limit the execution order of "obtaining a plurality of self-locations of the mobile device" in step S21 and "obtaining a plurality of obstacle locations" in step S22. The present disclosure also does not limit the order of obtaining the boundary profile in step S23 and obtaining the self-circle in step S24. For example, in some embodiments, the step S21 may be first executed to obtain the self-locations of the mobile device 10, and the step S22 may be subsequently executed to obtain the obstacle locations. Alternatively, the step S22 may be first executed to obtain the obstacle locations and then the step S21 may be executed to obtain the self-locations of the mobile device 10. Alternatively, the step S21 of obtaining the self-locations of the mobile device 10 and the step S22 of obtaining the obstacle locations may be executed alternately or simultaneously or non-simultaneously. For steps S23-S25, for example, the step S23 of obtaining the boundary profile may be first executed and then the step S24 of obtaining the self-circle may be executed. Alternatively, the step S24 of obtaining the self-circle may be first executed and then the step S23 of obtaining the boundary profile may be executed. Alternatively, the step S23 of obtaining the boundary profile and the step S24 of obtaining the self-circle may be simultaneously executed, non-simultaneously executed, or alternately executed. The present disclosure also does not limit the steps of S23 of obtaining the boundary profile and/or the step S24 of obtaining the self-circle and the step S25 of comparing the boundary profile and the self-circle. For example, the closed lines forming the boundary profile and the self-circle may be first established (the boundary profile and the self-circle may be simultaneously established or established in an order), and then the relative location relationship between the boundary profile and the self-circle may be established through comparison. Alternatively, comparison may be performed between already established portions of the boundary profile and the self-circle while the boundary profile and the self-circle are being established. After establishing the complete boundary profile and the self-circle, a final determination may be made to determine which of the boundary profile and the self-circle is at an outer side, or whether the boundary profile is located at an outer side or an inner side of the self-circle.

S26: processing a map of a closed space based on the outer profile.

The closed space may be a space that is at least partially enclosed by obstacles such as a wall or an object similar to a wall (e.g., a door, a furniture and/or home appliances such as refrigerator or TV cabinet, which may be fixedly placed against a wall for long time; indoor objects placed against the wall and hard to move, such as a floor cabinet fixedly connected to the wall through welding or expansion pins) as outside boundaries. The closed space is not limited to a space that is in a fully closed state at any situation. The closed space may also include a closed space that has an openable opening. For example, the closed space may be a fully closed space enclosed by walls and closed doors. Even when the doors are open and the space is not in a fully closed status, the space enclosed by the openable door is still a "closed space" in the present disclosure. The closed space of the present disclosure may also include a partially closed space, for example, a non-fully closed space enclosed by walls at three sides and there is an opening at the fourth side. As another example, a space enclosed by walls and a door frame without a door being installed may also be a closed space after the door is installed. Thus, although this space does not have a door and therefore has an opening, this space is also a "closed space" according to the present disclosure. The map of the closed space may be newly created or built during the movement of the mobile device. For example, the map may be newly created while the method of processing the map of the closed space is performed according to the disclosed embodiment. Alternatively, the map may be newly created after the method of processing the map of the closed space is performed according to the disclosed embodiment. Alternatively, the map of the closed space may be pre-stored in the mobile device, or may be obtained by the mobile device 10 from other devices (e.g., a server or a mobile terminal communicatively connected with the mobile device).

Processing the map of the closed space based on the outer profile may include at least one of the following:

in a first processing method, the types of the obstacles (or obstacle types) in the map of the closed space may be updated based on the outer profile. The obstacle type may include at least outside boundary. For example, for the obstacles that surround at least some areas or zones of the closed space or the work zone (e.g., a door, a furniture and/or home appliances such as refrigerator or TV cabinet, which may be fixedly placed against a wall for long time; indoor objects placed against the wall and hard to move, such as a floor cabinet fixedly connected to the wall through welding or expansion pins), this type of obstacles may be categorized as "outside boundary" type obstacles. Because an obstacle of any size on the outer profile is an outside boundary type obstacle, the outside boundary type obstacle can be large or small. For example, a zero-dimension location point on the boundary profile is an outside boundary type obstacle. A closed line formed by sequentially connecting adjacent obstacles on the outer profile according to a predetermined rule (e.g., the above-described time interval and/or distance interval, etc.), i.e., the outer profile itself, is also an outside boundary (from the perspective of the obstacle type, the outer profile also belongs to an outside boundary type obstacle). In some embodiments, the obstacle type may also include fixed obstacles and/or movable obstacles. Fixed obstacles may be various obstacles that are not frequently moved or not easy to move (such obstacles may or may not lean against a wall, may or may not belong to an outer profile, or may be an isolated obstacle that does not belong to a boundary profile), such as a wall, a large furniture, home appliances, etc., including, for example, a floor cabinet, a bed, a TV cabinet, a sofa, an air conditioner, a washing machine, etc. During the multiple movements of the mobile device, an obstacle that is not detected every time at a specific location may be categorized as a type of "movable obstacle." For example, movable obstacles may include a trash can or a slipper that may be moved by the mobile device, a movable chair, a movable table, a furniture, moving human, an animal, a door that may be closed some time or open some time, etc. To update the obstacle type in the map of the closed space based on the outer profile, for example, after determining the outer profile during a movement of the mobile device, the outer profile may be marked as an outside boundary, or the obstacle type of some or a specific location point on the outer profile may be marked as an outside boundary. If the mobile device 10 moves in the same work zone for N times, during this process, if the mobile device 10 detects the obstacle at a specific location for n times, and n reaches a predetermined number of times threshold range (e.g., n is greater than a predetermined number of times threshold, or reaches a predetermined ratio threshold, or n=N), then the obstacle type at this location may be updated as a fixed obstacle. The predetermined ratio threshold may be 80%, for example, which means at least 8 times in the total of 10 times of movements, the obstacle is detected at this location. It may be determined that the obstacle is fixed at this location. If during M times of movements in the same work zone, the mobile device 10 detects an obstacle at the same location for m times, and m reaches a predetermined number of times threshold range (e.g., m is less than a predetermined number of times threshold, or is less than a predetermined ratio threshold, or m<M), then the obstacle type at this location may be updated as a movable obstacle, as the obstacle does not frequently appear at this location.

It should be noted that the categorization of "fixed obstacles" and "movable obstacles" is different from the categorization of "outside boundary" and "inside boundary." For example, a door is both a movable obstacle and an outer profile. A weight supporting column in a room may be both an inner profile and a fixed obstacle. To achieve the technical effect of the present technical solution, i.e., processing the map of the closed space based on the outer profile, the priority of the obstacles determined as "outside boundary" type through the outer profile may be set at the highest priority. That is, regardless of whether an obstacle recognized as an outside boundary is a movable obstacle or a fixed obstacle, this obstacle may be marked as an "outside boundary" at a high priority. Subsequent steps may include processing the map of the closed space based on the "outside boundary" type obstacles or directly based on the "outer profile." In some embodiments, recognition of obstacles may be performed simultaneously based on "outside boundary" or "inside boundary" and "fixed obstacle" or "movable obstacle," and the map may be processed based on the recognition of the obstacles, or the mobile device 10 may be controlled to take a specific action based on the recognition of the obstacles. For example, in the following, detailed descriptions will be provided to introduce an embodiment in which a "map frame" is determined based on locations of obstacles that both belong to "fixed obstacle" type and belong to "outside boundary" type, and an embodiment in which a "door" is determined based on locations of obstacles that both belong to "movable obstacle" type and "outside boundary" type.

In a second processing method, zones in the closed space are recognized based on the outer profile.

In a third processing method, zone division is performed for the closed space based on the outer profile. For example, zones may be divided based on the outer profile or the map frame, and the divided zones may be further processed, such as zone integration to complete the final zone division. In some embodiments, the divided zones may be re-organized, for example, multiple zones may be integrated into a single zone, to achieve the final zone division.

In a closed space, a wall or similar obstacle that functions as a "wall" (e.g., a door, and/or a furniture and/or a home appliance that are fixed placed against a wall), i.e., the above "outside boundary" type obstacles, may limit the moving scope of the mobile device 10 in the closed space. In other words, the outside boundary defines the traversable zone in the work zone for the mobile device. Such outside boundaries and obstacles located thereon may be detected by the mobile device 10 when the mobile device 10 moves in the closed space. In some embodiments, the mobile device 10 may determine discrete obstacle locations and filter obtained obstacle locations based on the adjacent locations filtering condition, and may directly connect the selected adjacent obstacle locations to form a closed line or may obtain the closed line through fitting calculation. The closed line may be the boundary profile. The mobile device 10 may then determine and filter recorded locations or the trajectory that the mobile device 10 previously reached, based on the adjacent locations filtering condition, and may directly connect selected locations to form a closed line, or may obtain the closed line through fitting calculation. The closed line may form the self-circle. The mobile device 10 may compare the self-circle with the boundary profile. If the boundary profile encircles the self-circle at an outer side of the self-circle, the mobile device 10 may determine the boundary profile as an outer profile, and may mark the outer profile as an outside boundary, or may mark multiple obstacles on the outer profile as outside boundaries. Because the sensor information is typically acquired by sampling at a predetermined frequency (e.g., the sampling frequency of the IMU may be 200 Hz, the sampling frequency of the wheel encoder may be 100 Hz, the sample frequency of the camera may be 50 Hz) to obtain the adjacent locations (e.g., the self-locations of the mobile device 10 and/or the obstacle locations), the multiple adjacent locations are typically non-continuous, discrete points. The boundary profile is typically a continuous closed line formed by fitting the discrete adjacent locations. Thus, there is some difference between the outer profile and the obstacles on the outer profile. However, the present disclosure does not limit whether a discrete method or a continuous method is used to form the boundary profile, the outer profile, and/or the outside boundary. The outside boundary limits the traversable zone in the closed space, representing the division line between the various zones in the closed space. Thus, an actual movable scope in the work zone for the mobile device 10 may be determined based on the outer profile and the outside boundary. Therefore, on the basis of outer profile recognition, as long as the outer profile surrounding each zone's outside boundary in the closed space is used as the division line for each zone, each actual functional zone in the closed space may be conveniently recognized (also referred to as "zone recognition" or "recognition of zone" in the present disclosure). For example, traversable zones in a room (e.g., bedroom, bathroom, kitchen) may be obtained based on an outer profile recognized during one time of movement of the mobile device.

In some embodiments, because each room is connected/separated by doors that both belong to the "movable obstacle" and "outside boundary," doors can be recognized by combining obstacle types such as "outside boundary" and "movable obstacle." For example, the mobile device 10 may move for multiple times in a same work zone. In one of the movements, the mobile device 10 may successfully recognize the outer profile. In other movements, the mobile device 10 may discover that an obstacle or obstacles on a specific location/some locations of the outer profile disappeared. Based on the above-described method for determining a movable obstacle, the mobile device 10 may determine that the obstacle (or obstacles) corresponding to this location (or these locations) belongs to (or belong to) "movable obstacle." That is, the obstacles that disappeared in certain movements of the mobile device 10 both belong to the "outside boundary" and "movable obstacle" types. Such types of obstacles are normally the "doors" that are located between rooms, which are opened or closed from time to time. A closed line (i.e., the outer profile) formed by connecting the "door" obstacle and the "outside boundary" type obstacles near the "door" obstacle may be used as a basis for recognizing zones in the closed space. The "door" obstacle may be determined based on the above-described condition. In some embodiments, the "door" type obstacle may be directly set. A determination of such an obstacle may be based on, for example, whether the obstacle belongs to both of the "outside boundary" type and the "movable obstacle" type. Other technologies may also be used to recognize a "door." For example, a "door" may be recognized through a dilation and erosion algorithm. In some embodiments, the "door" may be recognized by comparing objects captured in images with a pre-set door shape, such as a trapezoid shape. In some embodiments, the mobile device 10 may automatically recognize the "door" from an image captured by a camera through deep learning algorithms. The recognized "door" and "outside boundary" type obstacles that are near the "door" may be connected to form a closed line as the outer profile, which may be used as the basis for recognizing zones in the closed space. Zone recognition may be a basis for zone division, or for instructing the mobile device 10 to perform various functions such as zone selection and executing tasks in the selected zone. The above embodiments show that zones (i.e., the actual functional areas in the closed space) may be recognized by recognizing outer profiles, thereby obtaining a zone division map after the zone recognition. Zone recognition may be performed based on the map frame concept described below and the relationship between the map frame and the outer profile, or may be based on the overall outer profile of the closed space (i.e., the map frame). If the mobile device 10 is connected through a network with a mobile terminal of a user, the mobile device 10 may transmit the zone division map after performing the zone recognition to the mobile terminal of the user. If the mobile device 10 is equipped with a display screen, the zone division map may be displayed on the display screen. In some embodiments, the recognized zone division map may be stored in the format of images or data in storage media such as a storage device/network server.

In some embodiments, on the basis of recognizing the outer profile or the map frame, the map of the closed space may be further processed. For example, in some embodiments, an automatic zone division may be performed for the closed space based on the outer profile or the map frame. The obtained zone division result may be consistent with the distribution and locations of the actual functional zones in the closed space. Therefore, recognizing the outer profile has a relatively high stability and reliability for recognizing zones in the closed space and for automatic zone division (also referred to as "dividing zones" or "zone division") for the closed space. For example, the outer profile may be used as the outside boundary of the closed space and the zone dividing line of each zone. The mobile device 10 may automatically perform zone recognition and division. For example, in a home, the mobile device 10 may automatically recognize various zones, and may divide a room into various zones based on actual configuration in the room, and may mark functional zones such as bedroom, kitchen, bathroom, hallway based on machine learning algorithms or based on user marking. In some embodiments, the map frame may be determined based on the outer profile, and the map frame may be used as the zone dividing line of various zones in the closed space to automatically dividing the closed space into various zones. In some embodiments, based on recognized zones, multiple zones may be combined or integrated based on a predetermined condition, and may be used as a combined zone when subsequently sending instructions to the mobile device. For example, the mobile device 10 may automatically or semi-automatically (with the user input or with assistance of other methods) recognize kitchen, hallway, and bathroom as three zones (i.e., actual functional zones) based on the methods disclosed herein. The mobile device 10 may combine these three zones into a single combined zone. Subsequently, instructions may be provided to the mobile device 10 to perform a task in the combined zone, which is treated as a single zone. Thus, combining multiple actual functional zones also belong to the zone division of the closed space of the present disclosure.

Figure 8A:
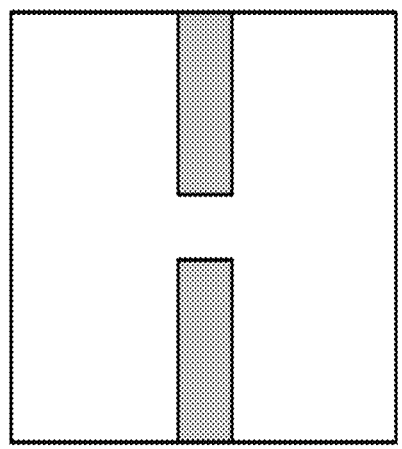
FIG. 8A is a schematic diagram of closed space, according to an embodiment of the present disclosure.
Figure 8B:
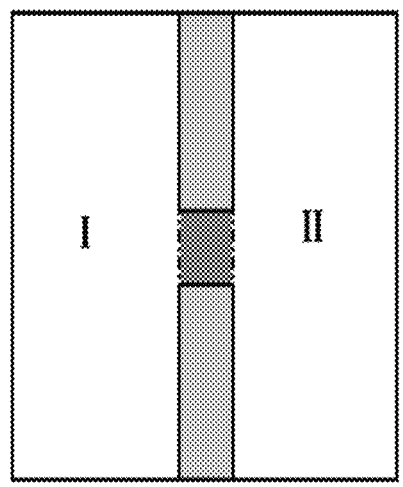
FIG. 8B is a schematic diagram showing division of the closed space into two zones through a fitting method, according to an embodiment of the present disclosure.

In the above-described zone recognition or zone division, in a partially formed profile (the portion may be a continuous line formed by connecting multiple adjacent obstacle locations or through fitting), a relatively narrow portion (e.g., with distance smaller than a predetermined width threshold) between two profile locations may be identified. A closed line may be formed through fitting the profile location points in this relatively narrow portion, such that the partially formed profile that is not fully closed may be artificially closed through the fitting method to form a boundary profile. In some embodiments, the fitting may be conducted through an expansion and erosion method, or through direct connection, or through connecting via a certain smooth curve. The boundary profile may be compared with the self-circle to determine whether the boundary profile is an outer profile. For an outer profile already recognized by the mobile device 10 (such as the zone outside of the gray zone as shown in FIG. 8A), through the expansion and erosion algorithm or any other suitable method for recognizing the narrowest portion of the closed zone enclosed by the boundary profile, the narrow portion of the outer profile may be determined and artificial fitting may be performed, thereby further dividing the outer profile into two or more mutually connected outer profiles. For example, with reference to FIG. 8A, in FIG. 8B, the space is divided by a fitting line represented by a dash-dotted line. The closed line formed by the original outer profile and the fitting line is the new outer profile in FIG. 8B, which divides the zone shown in FIG. 8A into zone I on the left and the zone II on the right. The profile locations are location points on the profile (which may be closed boundary profile or non-closed partial profile). The profile locations may be locations of actual obstacles that the profile passes or locations near the actual obstacle locations within a predetermined distance threshold range. The profile locations may also be locations on a connecting line connecting two adjacent obstacle locations (where there is no actual obstacle).

In a fourth processing method, the map of the closed space may be updated based on the outer profile. For example, in the subsequent movement of the mobile device, after a new outer profile is created, the new outer profile may be used to replace a portion or all of the old outer profiles. In some embodiments, the new outer profile and the old outer profiles may be simultaneously recorded and/or displayed. For example, multiple outer profiles formed in multiple movements of the mobile device 10 may be marked in the same map using different fashions, such that subsequently the new and old outer profiles may be simultaneously displayed on the map through different fashions (e.g., different colors, different line types, and/or lines with number or text marks), or outer profiles satisfying a user defined condition may be displayed. The simultaneous displaying of the new and old outer profiles may include simultaneously displaying two or more outer profiles that satisfy a predetermined selection condition.

In a fifth processing method, the map frame may be determined or updated in the map of the closed space based on the outer profile.

The map frame may be regarded as a fixed frame formed by connecting various outer profiles of the multiple zones in the same closed space in which the mobile device 10 moves. For example, the mobile device 10 may move in the same closed space for multiple times, and for at least two times the mobile device 10 moves in work zones that are not fully the same (the different work zones are both in the same closed space). The mobile device 10 may recognize the outer profiles of various zones (i.e., actual functional zone) of the closed space during the multiple movements. These outer profiles may be connected to form the map frame for distinguishing various functional zones. Thus, the map frame may also be regarded as a collection of the outer profiles of various zones in the closed space (i.e., the overall outer profile, but is different from the outer profile of the closed space itself). The concept of map frame in the present disclosure is similar to the indoor building architectural plot of a room, but these two are different. For example, the architectural plot is formed by almost all by walls. The map frame of the present disclosure is determined based on the outer profiles of the traversable zones that the mobile device 10 can actually reach. Thus, in the present disclosure, it is possible that the floor furniture or home appliances that are not moved for long time or hard to move may form a portion of the outer profile. That is, the outer profile may not necessarily be all formed by a wall or walls (due to the blocking by the floor furniture or home appliances, the mobile device 10 cannot move to the edge of the wall). Because the mobile device 10 may not cover all zones in the closed space during each movement, it is possible that the mobile device 10 may only move in a zone or a few zones in a certain movement. Thus, the outer profile obtained by the mobile device 10 in each movement may not be the overall outer profile of all zones (i.e., the actual functional zones) of the closed space. The map frame of the closes space is formed by a complete outer profile of the closed space constructed based on the location relationship between all outer profiles of all zones of the closed space. The two are not necessarily different. In some embodiments, if a closed space has only one zone, the outer profile of the zone is also the map frame of the closed space. In some embodiments, the map frame may be obtained by the mobile device 10 during a complete movement in the closed space.

In some embodiments, updating the map frame in the map of the closed space based on the outer profile may include the following. For example, each outer profile location point (i.e., location point on the outer profile) may be configured with a corresponding outer profile confidence level. In multiple movements, the mobile device 10 may update the outer profile confidence levels. A closed line may be formed by connecting those outer profile location points that have outer profile confidence levels reaching a predetermined threshold value according to a predetermined connection condition (e.g., the above-described adjacent locations filtering condition) and a predetermined connection sequence. The closed line may be used as the map frame. Updating the map frame in the map of the closed space may also include the following: marking multiple map frames formed during multiple movements of the mobile device 10 in different fashions on the same map, such that subsequently the new and old map frames may be displayed in the same map in different fashions (e.g., different colors, different line styles, and/or lines with number or text marks). Two or more map frames satisfying a predetermined selection condition may be displayed at the same time. Alternatively, a map frame satisfying a user defined predetermined condition may be displayed.

In some embodiments, determining the map frame based on the outer profile may include the following. For example, the outer profile may be directly used as the map frame, or the map frame may be formed by combining multiple outer profiles obtained in multiple movements by the mobile device 10 according to a mutual location relationship. This method is highly efficient. Determining the map frame based on the outer profile confidence level may also include the following. For example, a first predetermined threshold range may be pre-set (e.g., a maximum outer profile confidence level may be set). If the outer profile confidence level of an outer profile location point falls within the first predetermined threshold range, the map frame may be determined or updated based on the outer profile location point that has the outer profile confidence level falling within the first predetermined threshold range. For example, if the outer profile confidence level of each outer profile location point on an outer profile is greater than the maximum outer profile confidence level, the outer profile may be determined as the map frame. Alternatively, if a number of (but not all) outer profile confidence levels of a number of (but not all) outer profile location points on the outer profile are greater than the maximum outer profile confidence level, the number of outer profile location points that have the outer profile confidence levels greater than the maximum outer profile confidence level may be directly connected sequentially or may be fitted to form a closed line. The closed line may be determined as the map frame. In some embodiments, the map frame may be determined based on a combination of "fixed obstacle" type, and "outside boundary" type or the outer profile. For example, when determining the obstacle type based on the outer profile, if an obstacle type at a specific location is marked as "outside boundary," and belongs to "fixed obstacle," the obstacle at this location may be determined as being fixed at this location, which may belong to a location on the map frame (e.g., a wall, a home appliance located at the outside boundary locations, etc.). However, in some situations, a "fixed obstacle" may be located within the work zone, for example, the location of a weight supporting wall or weight supporting column that is located within the work zone and is not adjacent an outside wall, i.e., an obstacle belonging to the "outside boundary" type. It may not be accurate if the map frame is determined solely based on the "fixed obstacle." Therefore, the determination may also be based on the "outside boundary" type obstacles. For example, if a type of a certain location point belongs to "fixed obstacle" type and "outside boundary" type, the map frame may be determined based on a closed line formed by sequentially connecting or fitting those obstacle locations that belong to both the "fixed obstacle" type and the "outside boundary" type.

In some embodiments, when determining a map detail, a determined inner profile may be used as the map detail. Alternatively, determining the map detail may be based on an inner profile confidence level. An inner profile may be formed by location points that have inner profile confidence levels reaching a predetermined maximum inner profile confidence level. All or a portion of the inner profile may be used as the map detail.

In some application scenarios, processing the map based on the outer profile provides significant reference values. For example, when the mobile device 10 performs zone division based on the map, the zone division may be performed automatically based on the outer profile. Because the outer profile is located at an edge of a zone, it is more accurate and reliable to perform zone division based on the outer profile. For example, when dividing an indoor space into a plurality of rooms (i.e., actual functional zones), the mobile device 10 may divide the indoor space (i.e., the closed space of the present disclosure) based on walls to divide the indoor space into rooms (i.e., zone division), which is more consistent with the objective conditions of the indoor space, and is more reliable and accurate.

In the disclosed embodiments, the boundary profile may be obtained based on the obstacle locations, the self-circle may be obtained based on the self-locations of the mobile device, the outer profile may be determined based on the boundary profile and the self-circle, and the map of the closed space may be processed based on the outer profile. Accordingly, directly processing the map based on the outer profile may be realized, which enhances automatic levels, efficiency, and accuracy of the zone recognition, automatic zone division, map updating, etc. Thus, the mobile device 10 may conveniently and reliably execute tasks specifically based on the condition of each zone in the closed space, which can expand the application scope of the mobile device. Furthermore, the outer profile represents the boundary or boundary crossing of each zone in the closed space, which is more consistent with the objective distribution of the actual functional zones in the closed space. As a result, the processing of the map based on the outer profile is more accurate and reliable, and has a greater reference value.

After obtaining the outer profile and the self-circle, the following may be marked in the map: at least one of the obstacle locations, the outer profile, the self-locations of the mobile device, or the self-circle. Alternatively, location data of at least one of the outer profile, the obstacle locations, the self-locations of the mobile device, or the self-circle may be recorded. With regard to recording the location data of the outer profile, for example, as shown in FIG. 5, assuming that various location points of the outer profile include P1, P4 to P11, the location parameters of P1, P4 to P11 may be recorded. For example, the location parameter of P1 may be (x1, y1).

Further, in some embodiments, after determining an inner profile, the inner profile may be created in the map. For example, location parameters of various location points on the inner profile may be recorded in the map. As shown in FIG. 5, assuming the location points on the inner profile include P2 and P3, the location parameters of P2 and P3 may be recorded.

Further, in some embodiments, types of location points on the outer profile and the inner profile may be marked using different parameters. For example, the types corresponding to P1, P4 to P11 may be marked as 1, indicating that these location points are on the outer profile. The types corresponding to P2 and P3 may be marked as 0, indicating that these location points are on the inner profile. It should be understood that the manner of marking is not limited by the present disclosure. for example, the marking may be "outer" to represent an outer profile, and "inner" to represent the inner profile, etc.

Figure 8C:
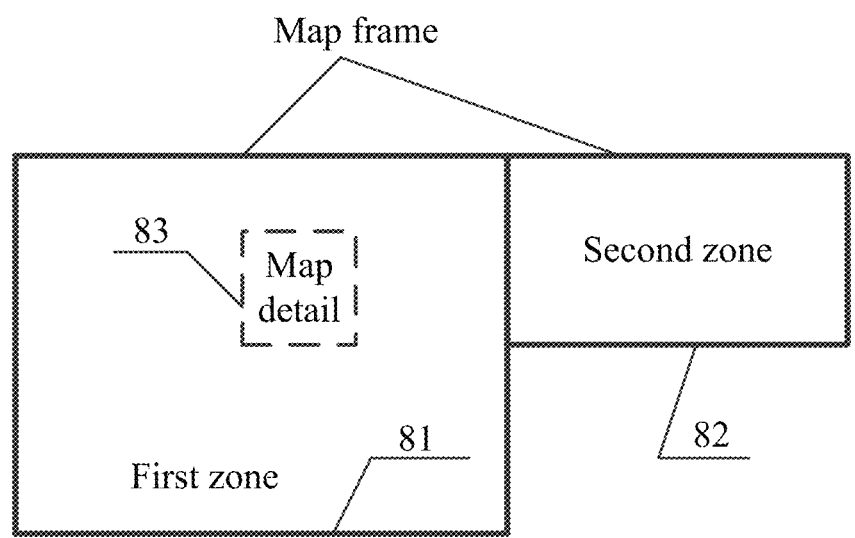
FIG. 8C is a schematic diagram showing zone division based on a map frame, and showing details included in the map, according to an embodiment of the present disclosure.

When the map includes the outer profile and the inner profile, the map frame may be determined based on the outer profile, the map detail may be determined based on the inner profile. Subsequently, zone division may be based on the map frame, and obstacle distribution condition in each zone may be obtained based on the map detail. For example, referring to FIG. 8C, the work zone in the map corresponding to the closed space may be divided into a first zone and a second zone based on the map frame. The obstacle distribution condition (e.g., whether there is a movable obstacle) in the first zone may be obtained based on the map detail.

In some embodiments, the outer profile confidence level may be determined or updated using the following method. For example, the mobile device 10 may create an outer profile, on which there is a location point A. If the location point A is also included in an outer profile created by the mobile device 10 in a subsequent movement, the outer profile confidence level at this location point may be increased. For example, the initial outer profile confidence level at a location point on the outer profile may be set to be 50, and each increment may be set to be 1, then when location point A is first detected as a location point on a first outer profile, the outer profile confidence level at location point A may be set to be the initial value 50. When the location point A is detected for the second time as a location point on a second outer profile created by the mobile device, the outer profile confidence level may be updated to be 51. When the location point A is detected for the third time as a location point on a third outer profile created by the mobile device, the outer profile confidence level may be updated to be 52, and so on.

Likewise, the mobile device 10 may create an inner profile, on which there is a location point B. If the location point B is also included in an inner profile created by the mobile device 10 in a subsequent movement, the inner profile confidence level of the location point B may be increased. For example, the initial inner profile confidence level at a location point on the inner profile may be set to be 10 (the initial value of the inner profile confidence level is typically smaller than the initial value of the outer profile confidence level), and each increment may be set to be 1. When location point B is detected as a location point on a first inner profile for the first time, the inner profile confidence level may be set to be the initial value of 10. When the location point B is detected for the second time as a location point on a second inner profile, the inner profile confidence level may be updated to be 11. When the location point B is detected for the third time as a location point on a third inner profile, the inner profile confidence level may be updated to be 12, and so on.

It should be understood that the outer profile confidence level and/or the inner profile confidence level may be increased, as described above, or may be decreased. For example, for a location point on the outer profile, if it is no longer on an outer profile in a subsequent detection, the outer profile confidence level of this location point may be decreased. For example, the mobile device 10 may create an outer profile, on which there is a location point A. If the location point A is no longer on a subsequently created outer profile in a subsequent detection, the outer profile confidence level at the location point A may be decreased. For example, the initial outer profile confidence level at a location point on the outer profile may be set to be 50, and each decrement may be set to be 1. When location point A is detected for the first time to be a location point on the outer profile, the outer profile confidence level may be set to be the initial value of 50. In a second detection, when the location point A is detected to be no longer on the outer profile, the outer profile confidence level of the location point A may be decreased to be 49, and so on. In some embodiments, for a location point that was once detected as a location point on an outer profile, as long as there is one time the location point is detected to be no longer belonging to an outer profile, the outer profile confidence level of this location point may be cancelled or set to be 0. Likewise, the mobile device 10 may create an inner profile, on which there is a location point B. If the location point B is no longer on an inner profile subsequently created by the mobile device, the inner profile confidence level at location point B may be decreased. For example, the initial inner profile confidence level at a location point on the inner profile may be set to be 10 (the initial inner profile confidence level is typically smaller than the initial outer profile confidence level), and each decrement may be 1. When the location point B is first detected to be a location point on an inner profile, the inner profile confidence level may be set to be the initial value of 10. In a second detection, when the location point B is no longer on an inner profile, the inner profile confidence level may be updated to be decreased to be 9, and so on.

For location points on an outer profile, if the outer profile confidence level of a specific location point falls within a first predetermined threshold range, e.g., greater than a first threshold (e.g., the maximum outer profile confidence level, such as 100), the location point may be determined as a location point on a map frame. Additionally/alternatively, for location points on the inner profile, if the inner profile confidence level of a specific location point falls within a third predetermined threshold range, e.g., greater than a third predetermined threshold (e.g., the maximum inner profile confidence level, such as 20), the location point may be determined as a location point on the map detail. Subsequently, zone division may be performed based on the map frame, and obstacle distribution conditions inside each zone may be obtained based on the map detail. For example, referring to FIG. 8C, after a first outer profile 81 and a second outer profile 82 are created, each of the first outer profile 81 and the second outer profile 82 may be determined to be a map frame (or a portion of a map frame). For example, if the outer profile confidence level of each location point on the first outer profile 81 and the second outer profile 82 reaches the predetermined maximum outer profile confidence level, then each of the first outer profile 81 and the second outer profile 82 may be determined as a map frame (or a portion of a map frame). Subsequently, zone division may be performed based on the map frame. For example, a closed zone enclosed by the outer profile 81 may be a first zone, a closed zone enclosed by the second outer profile 82 may be a second zone. In addition, after creating an inner profile 83, the inner profile 83 may be determined to be a map detail. For example, if the inner profile confidence level of each location point on the inner profile 83 reaches the predetermined maximum inner profile confidence level, the inner profile 83 may be determined to be the map detail. Subsequently, obstacle distribution condition within a corresponding zone may be obtained based on the map detail. For example, it may be learned that an inner obstacle exists within the first zone, such as a trash can, a leg of a table, etc.

In some embodiments, for location points on an outer profile, if the outer profile confidence level of a specific location point falls within a second predetermined threshold range, e.g., smaller than a second predetermined threshold (e.g., a minimum outer profile confidence level), the mobile device 10 may remove the specific location point from the outer profile. The minimum outer profile confidence level may be 0, or a value that is smaller than the initial outer profile confidence level. Additionally/alternatively, for location points on an inner profile, if the inner profile confidence level of a specific location point on the inner profile falls within a fourth predetermined threshold range, e.g., smaller than a fourth predetermined threshold (e.g., a minimum inner profile confidence level), the mobile device 10 may remove the specific location point from the inner profile. The minimum inner profile confidence level may be 0, or a value smaller than the initial inner profile confidence level.

Figure 9A:
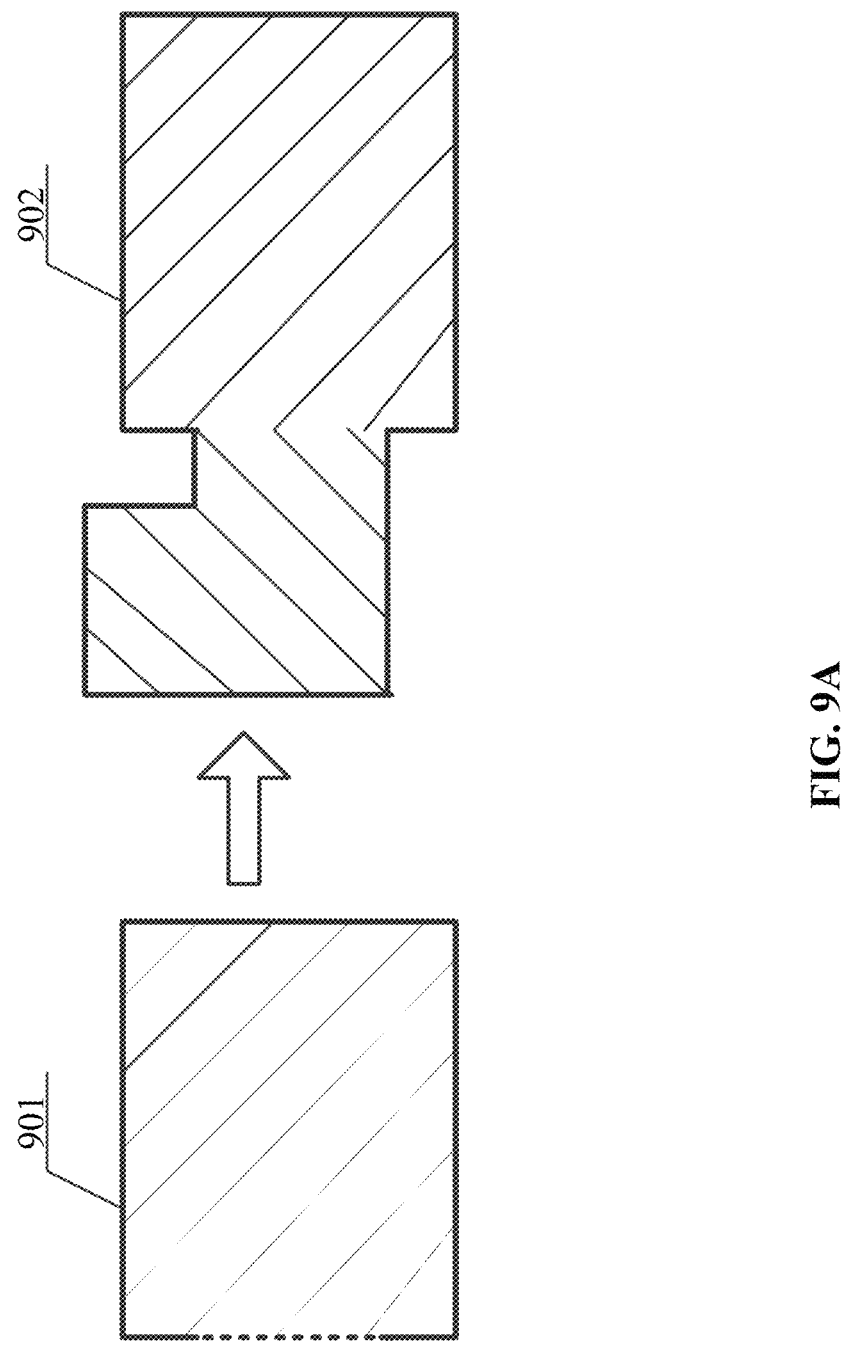
FIG. 9A is a schematic diagram showing updating an outer profile in the map, according to an embodiment of the present disclosure.

For example, a door may exist in a work zone, and may be previously in a closed state. In previous detections, the door may be determined to be a portion of an outer profile. For example, referring to FIG. 9A, the door and the walls on both sides may form an outer profile 901. The portion corresponding to the door is represented by a dotted line. When the door is in an open state, in subsequent detections, the mobile device 10 may discover that the outer profile confidence levels of the location points on the portion corresponding to the door continuously decrease, when the outer profile confidence levels decrease to reach the minimum outer profile confidence level, the portion corresponding to the door no longer belongs to the outer profile. When the door is in the open state, in detections, the mobile device 10 may discover a new outer profile 902. The new outer profile 902 may be formed by new obstacle locations (e.g., the walls of the zone on the left side of the door) and some location points of the previous outer profile 901 (e.g., the walls of the zone on the right side of the door).

Figure 9B:
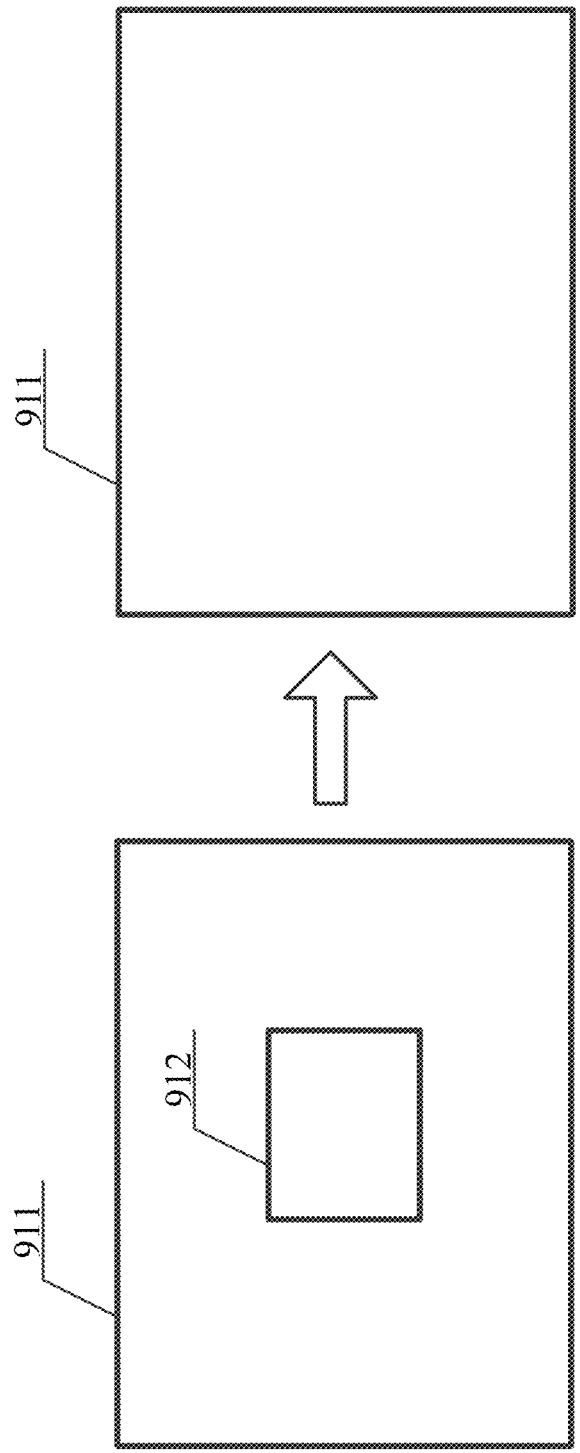
FIG. 9B is a schematic diagram showing updating an inner profile in the map, according to an embodiment of the present disclosure.

In some embodiments, if an inner profile was previously detected in a zone, and if an obstacle corresponding to the inner profile (e.g., movable obstacles such as trash can, dropped toys) has been moved, in subsequent detections, the inner profile confidence level at this location continuously decreases, when the minimum inner profile confidence level has been reached, the mobile device 10 may remove the inner profile (i.e., map detail) from the map. As shown in FIG. 9B, the previous map includes an outer profile 911 (or map frame) and an inner profile 912 (or map detail). In subsequent detections, if the inner profile confidence level of each location point on the inner profile reaches the minimum inner profile confidence level, the mobile device 10 may remove the inner profile from the map.

Further, in some embodiments, when displaying the outer profile and/or inner profile, different display fashions may be adopted based on different confidence levels. For example, gradual color change from red to purple may be used to represent confidence level changing from low to high. In some embodiments, a specific color such as blue may be changed gradually, from light blue to deep blue to represent the confidence level changing from low to high. In some embodiments, different confidence levels may be represented by different thicknesses or depths of solid lines of the outer profile and/or inner profile. In some embodiments, different confidence levels may be represented by different dot distances or darknesses of dots in the dotted line of the outer profile and/or inner profile.

Figure 10:
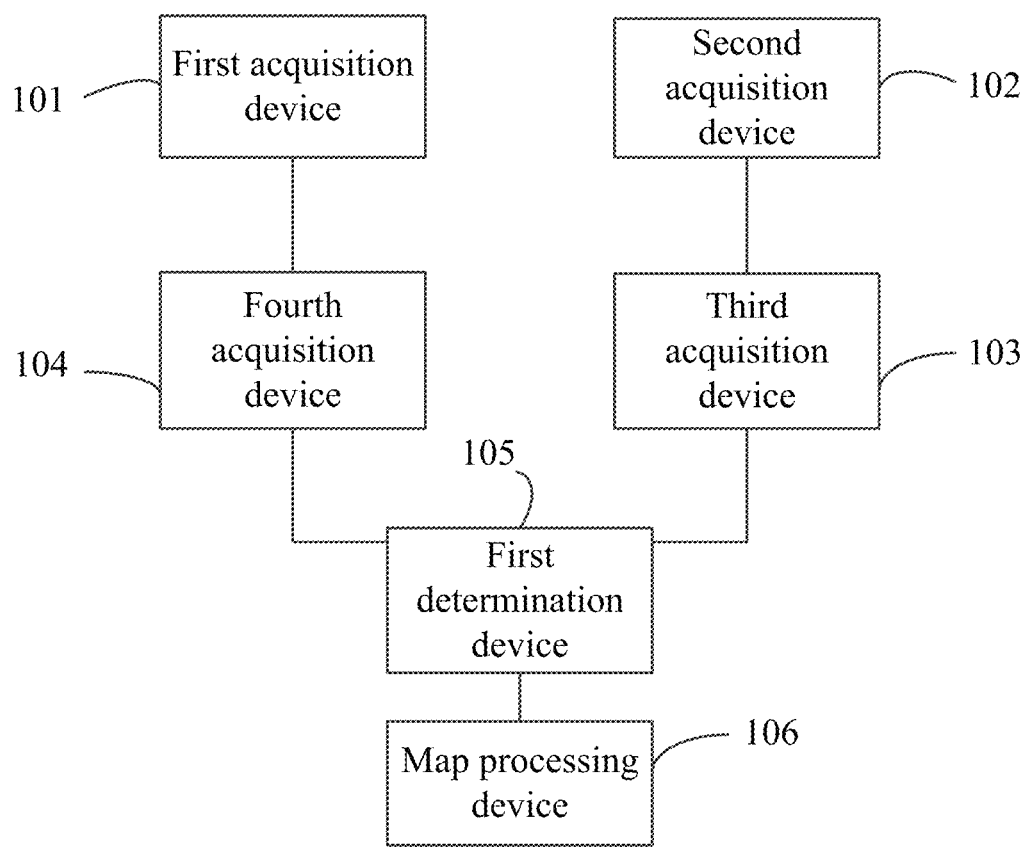
FIG. 10 illustrates a schematic diagram showing a structure of an apparatus for processing the map of the closed space, according to an embodiment of the present disclosure.

FIG. 10 shows a schematic diagram of the structural configuration of an apparatus 100 for processing the map of the closed space, according to an embodiment of the present disclosure. The apparatus 100 may be included in the mobile device 10 or 1000. As shown in FIG. 10, the apparatus 100 may include a first acquisition device 101, a second acquisition device 102, a third acquisition device 103, a fourth acquisition device 104, a first determination device 105, and a map processing device 106.

The first acquisition device 101 may be configured to obtain a plurality of self-locations of the mobile device.

The second acquisition device 102 may be configured to obtain a plurality of obstacle locations.

The third acquisition device 103 may be configured to obtain a boundary profile based on the obstacle locations, the boundary profile being a closed line formed by sequentially connecting multiple adjacent obstacle locations.

The fourth acquisition device 104 may be configured to obtain a self-circle based on the self-locations of the mobile device, the self-circle being a closed line formed by sequentially connecting multiple adjacent self-locations of the mobile device.

The first determination device 105 may be configured to determine the boundary profile as an outer profile when the boundary profile encircles the self-location at an outer side of the self-location.

The map processing device 106 may be configured to process the map of the closed space based on the outer profile.

In some embodiments, the apparatus may also include:
A fifth acquisition device configured to obtain the map of the closed space;
a first marking device configured to mark in the map at least one of: the obstacle locations, the boundary profile, the self-locations of the mobile device, or the self-circle.

In some embodiments, the map processing device 106 may be configured to execute one or more of the following tasks:
updating an obstacle type in the map of the closed space based on the outer profile; the obstacle type including at least an outside boundary;
recognizing zones of the closed space based on the outer profile;
dividing the closed space into zones based on the outer profile;
updating the map of the closed space based on the outer profile;
determining or updating the map frame in the map of the closed space based on the outer profile.

In some embodiments, the apparatus may also include:
a second determination device configured to determine that the boundary profile is an inner profile when the self-circle encircles the boundary profile at an outer side of the boundary profile.

In some embodiments, the apparatus may also include:
a first updating device configured to, if the mobile device 10 again determines an outer profile in a subsequent movement, and the again-determined outer profile and a previously determined historical outer profile share an outer profile location point at the same location, increase an outer profile confidence level of the outer profile location point at the same location; and/or, if the mobile device 10 again determines an outer profile in a subsequent movement, and at least one historical outer profile location point on a previously determined historical outer profile is not on the again-determined outer profile, decrease the outer profile confidence level of the historical outer profile location point that is not on the again-determined outer profile.

In some embodiments, the map processing device 106 may be configured to:
if the outer profile confidence level of an outer profile location point falls within a first predetermined threshold range, determine or update the map frame based on the outer profile location point that has the outer profile confidence level falling within the first predetermined threshold range.

In some embodiments, the map processing device 106 may be configured to:
if the mobile device 10 again determines an outer profile in a subsequent movement, and at least one historical outer profile location point on a previously determined historical outer profile is not on the again-determined outer profile, update the map based on one or more new outer profile location points that are on the again-determined outer profile and not on the previously determined historical outer profile.

In some embodiments, if the outer profile location points have outer profile confidence levels, the map processing device 106 may be configured to:
if the outer profile confidence level of a historical outer profile location point on a previously determined historical outer profile falls within a predetermined second threshold range, removing the outer profile location point that has the outer profile confidence level falling within the second predetermined threshold, such that the updated map no longer includes the outer profile location point that has the outer profile confidence level falling within the second predetermined threshold range.

In some embodiments, the inner profile location points have inner profile confidence levels, and the apparatus may also include:

a second updating device configured to: if the mobile device 10 again determines an inner profile in a subsequent movement, and the again-determined inner profile and a previously determined historical inner profile share an inner profile location point at a same location, increase the inner profile confidence level of the inner profile location point at the same location; and/or, if the mobile device 10 again determines an inner profile in a subsequent movement, and at least one historical inner profile location point on the previously determined historical inner profile is not on the again-determined inner profile, decrease the inner profile confidence level of the inner profile location point that is not on the again-determined inner profile.

In some embodiments, the apparatus may also include:

a second marking device configured to mark the inner profile in the map as a map detail; or, if the inner profile confidence level of each inner profile location point on the inner profile falls within a predetermined third threshold range, mark the inner profile in the map as the map detail.

In some embodiments, the apparatus may also include:

a deletion device configured to: if the inner profile confidence level of an inner profile location point falls within a fourth predetermined threshold range, remove the inner profile location point that has the inner profile confidence level falling within the fourth predetermined threshold range from the map, such that the updated map no longer includes the inner profile location point.

In some embodiments, the second acquisition device may be configured to:

when the mobile device 10 continuously performs obstacle detection while moving in the work zone, calculate an obstacle location based on parameters of the mobile device 10 itself and the self-location of the mobile device 10 when the obstacle is detected; and/or, when the mobile device 10 continuously performs obstacle detection while moving in the work zone and detects distance information of an obstacle, calculate the obstacle location based on the distance information of the obstacle and the self-location of the mobile device 10 when the obstacle is detected; and/or, when the mobile device 10 continuously performs obstacle detection while moving in the work zone, obtain the obstacle locations through detection; and/or, obtain obstacle locations based on the historical map.

Figure 11:
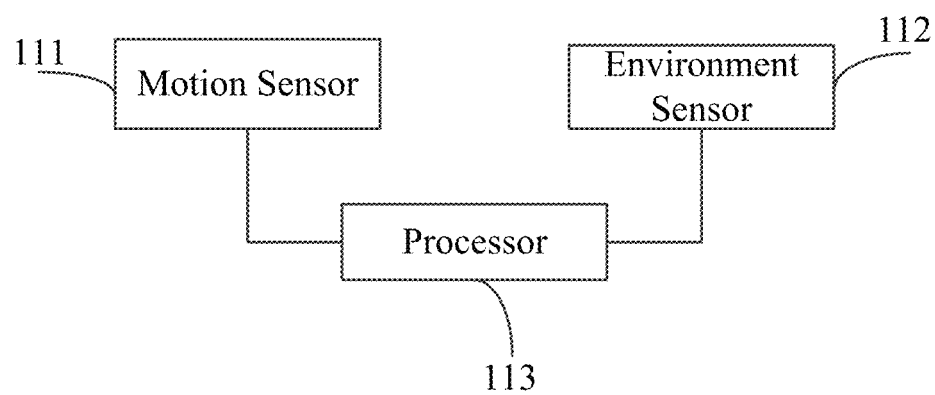
FIG. 11 illustrates a schematic diagram showing a structure of a mobile device, according to an embodiment of the present disclosure.

FIG. 11 is a schematic diagram showing the structure of a mobile device, according to an embodiment of the present disclosure. As shown in FIG. 11, the mobile device 10 may include a motion sensor 111, an environment sensor 112, and a processor 113.

The motion sensor 111 may be configured to obtain motion parameter information of the mobile device 10 itself.

The environment sensor 112 may be configured to obtain obstacle information in a work zone;

The processor 113 may be configured to: obtain a plurality of self-locations of the mobile device 10 and a plurality of obstacle locations based on the motion parameter information and/or the obstacle information; obtain a boundary profile based on the obstacle locations, the boundary profile being a closed line formed by sequentially connecting multiple adjacent obstacle locations; obtain a self-circle based on the self-locations of the mobile device, the self-circle being a closed line formed by sequentially connecting multiple adjacent self-locations of the mobile device; determine the boundary profile to be an outer profile based on a determination that the boundary profile encircles the self-circle at an outer side of the self-circle; process the map of the closed space based on the outer profile.

In some embodiments, the present disclosure may also include the following embodiments:

a mobile device, including a processor and a storage device connected with the processor. The storage device may be configured to store computer programs. The processor may be configured to retrieve the computer program stored in the storage device, and to execute any of the above-described embodiments of the method for processing the map of the closed space.

a non-transitory computer-readable storage medium, the storage medium stores computer programs. When the computer programs are executed, the mobile device 10 may perform any of the above-described embodiments of the method for processing the map of the closed space.

Regarding the apparatus of the above-described embodiments, the detailed operations performed by each module, unit, or device have been described in detail in relevant methods, which are not repeated.

It should be understood that the same or similar portions of the above-described embodiments may refer to each other. Detailed descriptions of certain aspect of an embodiment may refer to the same or similar descriptions in other embodiments.

It should be noted that in the present disclosure, the terms "first," "second," etc., are only used for descriptive purposes, and should not be understood as implying or indicating relative importance. In addition, in the descriptions of the present disclosure, unless otherwise noted, "multiple" means at least two.

Any process or method described in a flowchart or in other manner can be understood as indicating that the present disclosure includes one or more code modules, segments, or portions of executable instructions of steps that may realize a specific logic functions or processes. The present disclosure includes other embodiments not described herein. In some other embodiments, functions may be executed without following the illustrated or described order. For example, functions may be executed substantially simultaneously or according to different (e.g., opposite) orders. These variations are easily understood by a person having ordinary skills in the art as being within the scope of the present disclosure.

It should be understood that various portions of the present disclosure may be implemented through hardware, software, firmware, or a combination thereof. In the above-described embodiments, multiple steps or methods may be realized through software or firmware that are stored in a storage device and that may be executed by a suitable instruction executing system. For example, when realized using hardware, similar to another embodiment, any of the following or their combination may be used to realize at least a portion of the present disclosure: logic gate circuits and discrete logic circuits that implement logic function for digital signals, specific integrated circuits that include suitable combination of logic gate circuits, programmable gate array ("PGA"), field programmable gate array ("FPGA"), etc.

A person having ordinary skills in the art can understand that all of the steps or some of the steps of the methods may be realized through programs instructing relevant hardware. The programs may be stored in a computer-readable storage medium. When the programs are executed, one or a combination of the steps of the method may be executed.

In addition, in each embodiment of the present disclosure, each functional unit or device may be integrated in a processor, or may be individual physical unit or device. In some embodiments, two or more than two functional units or devices may be integrated in a single unit or device. The integrated unit or device may be realized using hardware, or may be realized using software functional modules. The integrated unit or device may be stored in a computer-readable storage medium if realized using software functional modules and is sold or used as an independent product.

The above-mentioned storage medium may be a read-only storage device, a magnetic disk, an optic disk, or any other suitable storage devices.

In the present descriptions, the reference terms "an embodiment," "some embodiments," "example," "specific example," or "some examples" means that the detailed features, structures, materials, or characteristics described with reference to the embodiments or examples are included in at least one of the embodiments or examples. In the present disclosure, the above terms do not imply that the embodiments or the example are the same. In addition, the detailed features, structures, materials, or characteristics may be combined in any suitable manner in any one or more embodiments or examples. For the alphabet reference indicators, low cases and upper cases may have different meanings. For example, T1 and t1 may refer to different contents. Whether an alphabet is followed by a number may have different meanings. For example, A and A1 may refer to different contents. In the present disclosure, different reference indicators may not necessarily represent different contents. For example, different reference indicators for different concepts may be the same. For example, t1 and t3 may be different or the same. Whether they are the same may be determined based on the main purpose of the descriptions in the specific embodiment. As long as the different reference indicators represent concepts that have a possibility to be the same, it is possible that the different reference indicators may be the same. For example, in the above embodiments, t1, t2 represent different time instances when the same self-location is obtained by the mobile device, and t3, t4 represent different time instances when the same obstacle location is obtained by the mobile device. Therefore, t1 may or may not be equal to t3, and t2 may or may not be equal to t4. Thus, one should not mechanically interpret various definitions, concepts, or reference indicators in various embodiments.

Although some embodiments have been described and illustrated, it should be understood that these embodiments are illustrative, and should not be understood as limiting the scope of the present disclosure. A person having ordinary skills in the art may change, modify, substitute, or vary the above embodiments within the scope of the present disclosure. The scope of the present disclosure is defined in the appended claims.

What is claimed is:

1. A method for processing a map of a closed space, comprising:
   obtaining, by a processor of a mobile device, a plurality of self-locations of the mobile device;
   obtaining, by the processor of the mobile device, a plurality of obstacle locations;
   obtaining, by the processor of the mobile device, a boundary profile based on the obstacle locations, the boundary profile being a closed line formed by sequentially connecting multiple adjacent obstacle locations;
   obtaining, by the processor of the mobile device, a self-circle based on the self-locations of the mobile device, the self-circle being a closed line formed by sequentially connecting multiple adjacent self-locations of the mobile device;
   determining, by the processor of the mobile device, the boundary profile as an outer profile when the boundary profile encircles the self-circle at an outer side of the self-circle;
   processing, by the processor of the mobile device, the map of the closed space based on the outer profile; and
   when an outer profile confidence level of an outer profile location point on the outer profile falls within a first predetermined threshold range, determining or updating, by the processor of the mobile device, a map frame based on the outer profile location point that includes the outer profile confidence level falling within the first predetermined threshold range.

2. The method of claim 1, further comprising:
   obtaining, by the processor of the mobile device, the map of the closed space; and
   marking, by the processor of the mobile device, in the map at least one of the obstacle locations, the boundary profile, the self-locations of the mobile device, or the self-circle.

3. The method of claim 1, wherein processing, by the processor of the mobile device, the map of the closed space based on the outer profile includes at least one of:
   updating, by the processor of the mobile device, obstacle types in the map of the closed space based on the outer profile, the obstacle types including at least an outside boundary;
   recognizing, by the processor of the mobile device, zones of the closed space based on the outer profile;
   performing, by the processor of the mobile device, zone division on the closed space based on the outer profile;
   updating, by the processor of the mobile device, the map of the closed space based on the outer profile; or
   determining or updating, by the processor of the mobile device, a map frame in the map of the closed space based on the outer profile.

4. The method of claim 3, wherein outer profile location points have corresponding outer profile confidence levels, and wherein updating, by the processor of the mobile device, the map of the closed space based on the outer profile comprises:
   when an outer profile confidence level of a historical outer profile location point on a previously determined historical outer profile falls within a second predetermined threshold range, removing, by the processor of the mobile device, the outer profile location point that has the outer profile confidence level falling within the second threshold range from the map.

5. The method of claim 1, further comprising determining, by the processor of the mobile device, the boundary profile as an inner profile when the self-circle encloses the boundary profile at an outer side of the boundary profile.

6. The method of claim 1, wherein outer profile location points on the outer profile have corresponding outer profile confidence levels, and the method also comprises at least one of:

when the processor of the mobile device again determines an outer profile in a subsequent movement, and the again-determined outer profile and a previously determined historical outer profile include an outer profile location point at a same location, increasing, by the processor of the mobile device, an outer profile confidence level of the outer profile location point at the same location; or when the processor of the mobile device again determines an outer profile in a subsequent movement, and at least one historical outer profile location point on a previously determined historical outer profile is not located on the again-determined outer profile, decreasing, by the processor of the mobile device, an outer profile confidence level of the historical outer profile location point that is not on the again-determined outer profile.

7. The method of claim 1, determining or updating, by the processor of the mobile device, the map frame in the map of the closed space based on the outer profile includes:

when the processor of the mobile device again determines an outer profile in a subsequent movement, and at least one historical outer profile location point on a previously determined historical outer profile is not on the again-determined outer profile, updating, by the processor of the mobile device, the map based on a new outer profile location point that is located on the again-determined outer profile and not located on the previously determined historical outer profile.

8. The method of claim 1, wherein inner profile location points have corresponding inner profile confidence levels, the method further comprises at least one of:

when the processor of the mobile device again determines an inner profile in a subsequent movement, and the again-determined inner profile and a previously determined historical inner profile include an inner profile location point at a same location, increasing, by the processor of the mobile device, an inner profile confidence level of the inner profile location point at the same location; or when the processor of the mobile device again determines an inner profile in a subsequent movement, and at least one historical inner profile location point on a previously determined historical inner profile is not on the again-determined inner profile, decreasing, by the processor of the mobile device, an inner profile confidence level of the historical inner profile location point that is not on the again-determined inner profile.

9. The method of claim 1, further comprising at least one of:

marking, by the processor of the mobile device, an inner profile in the map as a map detail; or when an inner profile confidence level of each inner profile location point on the inner profile falls within a third predetermined threshold range, marking, by the processor of the mobile device, the inner profile in the map as a map detail.

10. The method of claim 1, further comprising:

when an inner profile confidence level of an inner profile location point falls within a fourth predetermined threshold range, removing, by the processor of the mobile device, the inner profile location point having the inner profile confidence level falling within the fourth predetermined threshold range from the map.

11. The method of claim 1, wherein obtaining, by the processor of the mobile device, the plurality of obstacle locations comprises at least one of:

continuously detecting, by the processor of the mobile device, obstacles when the mobile device moves within a work zone, and calculating, by the processor of the mobile device, the obstacle locations based on parameters of the mobile device and self-locations of the mobile device when detecting the obstacles;

continuously detecting, by the processor of the mobile device, obstacles when the mobile device moves within the work zone, detecting, by the processor of the mobile device, distance information of the obstacles, and calculating, by the processor of the mobile device, the obstacle locations based on the distance information of the obstacles and the self-locations of the mobile device when detecting the obstacles;

continuously detecting, by the processor of the mobile device, obstacles when the mobile device moves within the work zone, and obtaining, by the processor of the mobile device, the obstacle locations through the detection; or obtaining, by the processor of the mobile device, the obstacle locations by the mobile device based on a historical map.

12. A mobile device, comprising:

a motion sensor, configured to obtain motion parameter information of the mobile device;

an environment sensor configured to obtain obstacle information in a work zone;

a processor configured to:

obtain a plurality of self-locations of the mobile device and a plurality of obstacle locations based on the motion parameter information and/or the obstacle information;

obtain a boundary profile based on the obstacle locations, the boundary profile being a closed line formed by sequentially connecting multiple adjacent obstacle locations;

obtain a self-circle based on the self-locations of the mobile device, the self-circle being a closed line formed by sequentially connecting multiple adjacent self-locations of the mobile device;

determine the boundary profile as an outer profile when the boundary profile encircles the self-circle at an outer side of the self-circle; and process a map of a closed space based on the outer profile, wherein the processor is also configured to:

when an outer profile confidence level of an outer profile location point falls within a first predetermined threshold range, determine or update a map frame based on the outer profile location point that includes the outer profile confidence level falling within the first predetermined threshold range.

13. The mobile device of claim 12, wherein when the processor processes the map of the closed space based on the outer profile, the processor is also configured to perform at least one of the following:

updating obstacle types in the map of the closed space based on the outer profile, the obstacle types including at least an outside boundary;

recognizing zones of the closed space based on the outer profile;

performing zone division on the closed space based on the outer profile;

updating the map of the closed space based on the outer profile; or determining or updating a map frame in the map of the closed space based on the outer profile.

14. The mobile device of claim 12, wherein outer profile location points on the outer profile have corresponding outer profile confidence levels, and the processor is configured to perform at least one of:
when the mobile device again determines an outer profile in a subsequent movement, and the again-determined outer profile and a previously determined historical outer profile include an outer profile location point at a same location, increasing an outer profile confidence level of the outer profile location point at the same location; or
when at least one historical outer profile location point on the previously determined historical outer profile is not located on the again-determined outer profile, decreasing an outer profile confidence level of the historical outer profile location point that is not on the again-determined outer profile.

15. The mobile device of claim 12, wherein outer profile location points on the outer profile have corresponding outer profile confidence levels, and wherein the processor is also configured to:
when an outer profile confidence level of a historical outer profile location point on a previously determined historical outer profile falls within a second predetermined threshold range, remove the outer profile location point that has the outer profile confidence level falling within the second threshold range from the map.

16. A non-transitory computer-readable storage medium storing computer-executable instructions, which when executed by a processor of a mobile device, are configured to cause the processor of the mobile device to perform a method for processing a map of a closed space, the method comprising:
obtaining, by the processor of the mobile device, a plurality of self-locations of the mobile device;
obtaining, by the processor of the mobile device, a plurality of obstacle locations;
obtaining, by the processor of the mobile device, a boundary profile based on the obstacle locations, the boundary profile being a closed line formed by sequentially connecting multiple adjacent obstacle locations;
obtaining, by the processor of the mobile device, a self-circle based on the self-locations of the mobile device, the self-circle being a closed line formed by sequentially connecting multiple adjacent self-location of the mobile device;
determining, by the processor of the mobile device, the boundary profile as an outer profile when the boundary profile encircles the self-circle at an outer side of the self-circle;
processing, by the processor of the mobile device, the map of the closed space based on the outer profile; and
when an outer profile confidence level of an outer profile location point on the outer profile falls within a first predetermined threshold range, determining or updating, by the processor of the mobile device, a map frame based on the outer profile location point that includes the outer profile confidence level falling within the first predetermined threshold range.

17. The non-transitory computer-readable storage medium of claim 16, wherein processing, by the processor of the mobile device, the map of the closed space based on the outer profile comprises at least one of:
updating, by the processor of the mobile device, obstacle types in the map of the closed space based on the outer profile, the obstacle types including at least an outside boundary;
recognizing, by the processor of the mobile device, zones of the closed space based on the outer profile;
performing, by the processor of the mobile device, zone division on the closed space based on the outer profile;
updating, by the processor of the mobile device, the map of the closed space based on the outer profile; or
determining or updating, by the processor of the mobile device, a map frame in the map of the closed space based on the outer profile.

18. The non-transitory computer-readable storage medium of claim 16, wherein outer profile location points on the outer profile have corresponding outer profile confidence levels, and the method also comprises at least one of:
when the processor of the mobile device again determines an outer profile in a subsequent movement, and the again-determined outer profile and a previously determined historical outer profile include an outer profile location point at a same location, increasing, by the processor of the mobile device, an outer profile confidence level of the outer profile location point at the same location; or
when at least one historical outer profile location point on the previously determined historical outer profile is not located on the again-determined outer profile, decreasing, by the processor of the mobile device, an outer profile confidence level of the historical outer profile location point that is not on the again-determined outer profile.

* * * * *